US012561487B2

(12) United States Patent
Li et al.

(10) Patent No.: US 12,561,487 B2
(45) Date of Patent: Feb. 24, 2026

(54) SECURITY SERVICE SWITCHING METHOD AND TERMINAL

(71) Applicant: Huawei Technologies Co., Ltd., Shenzhen (CN)

(72) Inventors: Zhuofei Li, Beijing (CN); Wei Gao, Beijing (CN); Yongwei Guo, Shenzhen (CN); Nianhao Zhu, Shanghai (CN); Xiangwen Kong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 18/702,175

(22) PCT Filed: Jun. 13, 2023

(86) PCT No.: PCT/CN2023/100042
§ 371 (c)(1),
(2) Date: Apr. 17, 2024

(87) PCT Pub. No.: WO2024/001767
PCT Pub. Date: Jan. 4, 2024

(65) Prior Publication Data
US 2025/0232068 A1      Jul. 17, 2025

(30) Foreign Application Priority Data

Jun. 30, 2022      (CN) ......................... 202210764350.X

(51) Int. Cl.
*G06F 21/81* (2013.01)
*G06K 7/10* (2006.01)

(52) U.S. Cl.
CPC ......... *G06F 21/81* (2013.01); *G06K 7/10297* (2013.01)

(58) Field of Classification Search
CPC ............... G06F 21/81; G06K 7/10297; G06Q 20/3227; G06Q 20/3278; G06Q 20/3574; H04W 8/183; H04W 4/80; H04W 12/08; H04W 8/265
See application file for complete search history.

(56) References Cited

U.S. PATENT DOCUMENTS

| | | | | |
|---|---|---|---|---|
| 6,687,350 B1* | 2/2004 | Landry | ................. | G07F 7/0886 |
| | | | | 379/144.04 |
| 11,625,707 B1* | 4/2023 | Macy | ............... | G06Q 20/40145 |
| | | | | 705/39 |
| 2011/0053556 A1* | 3/2011 | Masaryk | ............. | G06F 3/03541 |
| | | | | 455/406 |
| 2014/0106670 A1* | 4/2014 | Gree | ........................ | H04B 5/79 |
| | | | | 455/41.1 |

(Continued)

*Primary Examiner* — El Hadji M Sall
(74) *Attorney, Agent, or Firm* — Conley Rose, P.C.

(57) ABSTRACT

A method includes, when a first card in a secure element (SE) system of a terminal is in an inactive state after the terminal is powered off, subsequent to receiving, using a near-field communication (NFC) system, an instruction for selecting the first card that is received from a card reading device, the terminal determines, based on the instruction, that the first card allows automatic card switching, and activates the first card using the SE system, and after the terminal receives again, using the NFC system, the instruction for selecting the first card from the card reading device, the first card of the terminal executes a transaction service with the card reading device.

20 Claims, 18 Drawing Sheets

(56) References Cited

U.S. PATENT DOCUMENTS

| | | | |
|---|---|---|---|
| 2014/0203082 A1* | 7/2014 | Huh ..................... | G06K 7/0004 |
| | | | 235/440 |
| 2016/0034887 A1* | 2/2016 | Lee .......................... | G09G 5/12 |
| | | | 705/39 |
| 2021/0136540 A1* | 5/2021 | Harmon .............. | H04W 12/033 |

* cited by examiner

SECURITY SERVICE SWITCHING METHOD AND TERMINAL

CROSS-REFERENCE TO RELATED APPLICATIONS

This is a U.S. National Stage of International Patent Application No. PCT/CN2023/100042 filed on Jun. 13, 2023, which claims priority to Chinese Patent Application No. 202210764350.X filed on Jun. 30, 2022. Both of the aforementioned applications are hereby incorporated by reference in their entireties.

TECHNICAL FIELD

This application relates to the terminal field, and in particular, to a security service switching method and a terminal.

BACKGROUND

Currently, a terminal such as a mobile phone or a watch includes three layers of application environments: a rich execution environment (Rich Execution Environment, REE), a trusted execution environment (Trusted Execution Environment, TEE), and a secure element (Secure Element, SE). The terminal deploys corresponding applications in the three layers of application environments based on different security levels of data in security services (such as a bank card, a bus card, and a vehicle key). In other words, corresponding applications may be set for one security service in the REE, the TEE, and the SE. It should be noted that, before a transaction of a security service, an application of the security service in the SE needs to be in an active state. If the application of the security service in the SE is in an inactive state, a user needs to manually activate the application of the security service in the SE. In some technologies, the terminal may alternatively automatically activate the application of the security service in the SE. For example, Huawei Smart Swipe can automatically identify scenarios based on conditions such as geographical locations and card reading devices, and automatically activate an application of a current security service in the SE, that is, implement automatic security service switching. However, efficiency of automatic security service switching of a terminal is low. In addition, when the terminal is powered off, the terminal cannot implement automatic security service switching.

SUMMARY

This application provides a security service switching method and a terminal, so that security service switching efficiency can be improved, and automatic switching can also be implemented when the terminal is powered off. This extends a security service switching scenario.

To achieve the foregoing objectives, embodiments of this application provide the following technical solutions.

According to a first aspect, a card switching method is provided, applied to a terminal that includes a near field communication NFC module and a secure element SE module. The SE module includes a first card. The method includes: Before the terminal is powered off the first card is in an inactive state; the terminal is powered off; after the terminal is powered off, the first card is still in the inactive state, and the terminal receives, by using the NFC module, a first instruction that is for selecting the first card and that is sent by a first card reading device; the terminal activates, by using the SE module, the first card after determining, based on the first instruction, that the first card is a card that allows automatic card switching; the terminal receives, by using the NFC module, a second instruction that is for selecting the first card and that is sent by the first card reading device; and the first card of the terminal executes a transaction service with the first card reading device in response to receiving the first instruction.

It should be noted that an entire automatic card switching path is located in the NFC module and the SE module, and does not pass through an REE module and a TEE module. In addition, when the terminal is powered off remaining power of the terminal may supply power to the NFC module and the SE module of the terminal, that is, the NFC module and the SE module of the terminal may still work, and automatic card switching may still be implemented. It may be learned that, when the terminal is powered off, automatic card switching of the terminal may still be implemented in this application.

It may be understood that, when the terminal is powered on, because the automatic card switching path does not pass through the REE module and the TEE module, in this application, a speed of automatic card switching during power-on is accelerated.

In a possible implementation, that the terminal activates, by using the SE module, the first card after determining, based on the first instruction, that the first card is a card that allows automatic card switching includes: The NFC module forwards, to the SE module, the first instruction that is for selecting the first card; and the SE module determines that the first card is a card that allows automatic card switching, and the SE module activates the first card.

In other words, the SE module triggers automatic activation of the first card. In a specific example, a COS in the SE module may specifically determine that the first card is a card that allows automatic card switching; and if the first card is a card that allows automatic card switching, a CRS in the SE module is invoked to activate the first card.

In a possible implementation, the SE module further includes a second card, and the second card is in an active state when the terminal is powered off; and after the SE module determines that the first card is a card that allows automatic card switching, and before the SE module activates the first card, the method further includes: The SE module deactivates the second card.

It should be noted that different cards may have different contactless parameter settings. In other words, when a conflict exists in contactless parameter activation of two or more cards, these cards cannot be activated simultaneously. In some examples, to avoid a failure in subsequently activating the first card, the second card in the active state is first deactivated, to ensure that the first card is successfully activated.

In a possible implementation, after the SE module determines that the first card is a card that allows automatic card switching, the method further includes: The SE module returns a first response to the NFC module, where the first response indicates the first card is not selected, and the first card is a card that allows automatic card switching.

In an example, the first response is a customized response, and is different from a response, in an existing standard, indicating that a card is not selected.

In a possible implementation, after the SE module returns the first response to the NFC module, the method further includes: The NFC module returns a second response to the first card reading device, where the second response indicates that the first card is not selected, and the second response is different from the first response.

In an example, the second response is a response, in an existing standard, indicating that a card is not selected (for example, an error code carried in the response is 6A82). The NFC module returns a standard response to the first card reading device. It may be learned that, in this embodiment, a communication protocol between the first card reading device and the terminal (specifically, the NFC module) does not need to be modified.

In a possible implementation, the SE module includes a fifth card, and the method further includes: When the fifth card is in an inactive state after the terminal is powered on, the terminal receives, by using the NFC module, a fifth instruction that is for selecting the fifth card and that is sent by a third card reading device; the NFC module forwards the fifth instruction to the SE module; and after the SE module determines, based on the fifth instruction, that the fifth card is a card that does not allow automatic card switching, the SE module returns a third response to the NFC module, where the third response indicates that the fifth card is not selected, and the fifth card is a card that does not allow automatic card switching.

In other words, when the terminal is powered on, when the selected fifth card is a card that does not allow automatic card switching, the COS returns the third response (namely, a standard response, for example, an error code carried in the response is 6A82) to the NFC module. Therefore, the NFC module may determine, based on the returned third response, that the fifth card is a card that does not allow automatic card switching. Subsequently, the terminal may execute service logic of non-automatic card switching by using the REE module, to prompt a user to manually activate the fifth card.

It may be learned that this application further provides a method in which the NFC module determines whether a to-be-activated card is a card that allows automatic card switching, so that the NFC module executes different service logic.

In a possible implementation, the terminal further includes a rich execution environment REE module; and after the SE module returns the third response to the NFC module, the method further includes: After receiving the third response, the NFC module sends a sixth instruction to the REE module, where the sixth instruction is used to prompt a user to manually activate the fifth card.

In a possible implementation, before the terminal is powered off, the first card is in an inactive state.

In a possible implementation, the method further includes: When the terminal is powered off, the terminal exchanges, by using the NFC module, a message that is based on a first protocol with a second card reading device; and after preset duration after the terminal starts to exchange, by using the NFC module, the message that is based on the first protocol with the second card reading device, if the NFC module does not receive a message that is based on a second protocol and that is sent by the second card reading device, the NFC module sends, to the SE module, a third instruction that is for selecting a third card and that is based on the second protocol, where the third instruction includes a preset application identifier AID. Therefore, a solution of triggering a non-standard card (namely, a card that originally does not support the second protocol) to perform automatic card switching based on the second protocol is provided.

In a possible implementation, after the NFC module sends, to the SE module, the third instruction that is for selecting the third card and that is based on the second protocol, the method further includes: The SE module modifies the third instruction to a fourth instruction after receiving the third instruction, where the fourth instruction includes an AID of a fourth card, and the fourth card is a user identifier UID card, and after determining that the fourth card is in an inactive state, and the fourth card is a card that allows automatic card switching, the SE module activates the fourth card. Therefore, a solution of automatic card switching for a non-standard card is provided.

In a possible implementation, that the terminal activates, by using the SE module, the first card after determining, based on the first instruction, that the first card is a card that allows automatic card switching includes: After the NFC module determines that the first card is a card that allows automatic card switching, the NFC module indicates the SE module to activate the first card.

Therefore, service logic triggered by the NFC module for activating the first card is provided.

In a possible implementation, that the terminal activates, by using the SE module, the first card after determining, based on the first instruction, that the first card is a card that allows automatic card switching further includes: After receiving an instruction that is for activating the first card, the SE module determines whether the first card is a card that allows automatic card switching; and the SE module activates the first card after determining that the first card is a card that allows automatic card switching.

In other words, after the NFC module triggers the service logic for activating the first card, the SE module needs to perform security check on an instruction that is for activating the first card, that is, the SE module determines whether the first card is a card for automatic card switching, providing importance of a card transaction.

In a possible implementation, the SE module includes a second card, and the second card is in an active state when the terminal is powered off; and before the SE module activates the first card, the method further includes: The SE module deactivates the second card.

In a possible implementation, after the terminal receives, by using the NFC module, the first instruction that is for selecting the first card and that is sent by the first card reading device, the method further includes: The NFC module forwards, to the SE module, the first instruction that is for selecting the first card; the SE module returns a fourth response to the NFC module based on the first instruction, where the fourth response indicates that the first card is not selected; and in response to receiving the fourth response, the NFC module determines whether the first card is a card that allows automatic card switching. Therefore, an occasion at which the NFC module triggers activation of the first card is provided.

In a possible implementation, before the terminal is powered off, the method further includes: The NFC module receives a first card list, where the first card list includes information about a card that allows automatic card switching. Therefore, a method in which the NFC module determines whether the first card is a card for automatic card switching is provided.

In a possible implementation, the terminal further includes a trusted execution environment TEE module; and before the terminal is powered off, the method further includes: The SE module receives a second card list sent by the TEE module, where the second card list includes information about a card that allows automatic card switching. Therefore, a method in which the SE module determines whether the first card is a card for automatic card switching, or a method in which the SE module performs security check on the instruction that is for activating the first card is provided.

In a possible implementation, that the terminal activates, by using the SE module, the first card after determining, based on the first instruction, that the first card is a card that allows automatic card switching further includes: After receiving the first instruction and determining that the first card is in an inactive state, the SE module determines whether the first card is a card that allows automatic card switching; and after determining that the first card is a card that allows automatic card switching, activates the first card.

In other words, the SE module triggers the service logic for activating the first instruction. In a specific example, the COS in the SE module may trigger the service logic for activating the first instruction.

In a possible implementation, the SE module further includes a second card, and the second card is in an active state when the terminal is powered off; and after the SE module determines that the first card is a card that allows automatic card switching, and before the SE module activates the first card, the method further includes: The SE module deactivates the second card.

In a possible implementation, the SE module includes a sixth card, the terminal further includes an REE module, and the method further includes: When the sixth card is in an inactive state after the terminal is powered on, the terminal receives, by using the NFC module, a seventh instruction that is for selecting the sixth card and that is sent by a fourth card reading device; and the NFC module forwards the seventh instruction to the SE module. After the SE module determines, based on the seventh instruction, that the sixth card is a card that does not allow automatic card switching, the SE module returns a fifth response to the NFC module, where the fifth response indicates that the sixth card is not selected; after receiving the fifth response, the NFC module sends, to the SE module, an eighth instruction that is for selecting the sixth card; the SE module determines that the sixth card is in an inactive state, and returns a sixth response to the NFC module, where the sixth response indicates that the sixth card is not selected; and after receiving the sixth response, the NFC module sends a ninth instruction to the REE module, where the ninth instruction is used to prompt the user to manually activate the sixth card. Therefore, a method in which the NFC module determines whether a to-be-activated card is a card that allows automatic card switching is provided, so that the NFC module executes different service logic.

According to a second aspect, a terminal is provided, including a processor, a memory, a near field communication NFC module, and a touchscreen. The memory, the touchscreen, and the NFC module are coupled to the processor, the processor includes a secure element SE module, the memory is configured to store computer program code, and the computer program code includes computer instructions; and when the processor reads the computer instructions from the memory, the terminal is enabled to perform the method according to any one of the foregoing aspects or the possible implementations of the foregoing aspects.

According to a third aspect, an apparatus is provided. The apparatus is included in a terminal, and the apparatus has a function of implementing behavior of the terminal in any method according to the foregoing aspects or the possible implementations. The function may be implemented by hardware, or may be implemented by hardware executing corresponding software. The hardware or the software includes at least one module or unit corresponding to the foregoing function, for example, a receiving module or unit, a display module or unit, and a processing module or unit.

According to a fourth aspect, a computer-readable storage medium is provided. The computer-readable storage medium includes computer instructions. When the computer instructions are run on a terminal, the terminal is enabled to perform the method according to any one of the foregoing aspects or the possible implementations of the foregoing aspects.

According to a fifth aspect, a computer program product is provided. When the computer program product is run on a computer, the computer is enabled to perform the method according to any one of the foregoing aspects or the possible implementations of the foregoing aspects.

According to a sixth aspect, a chip system is provided. The chip system includes a processor. When the processor executes instructions, the processor performs the method according to any one of the foregoing aspects or the possible implementations of the foregoing aspects.

For technical effect that can be achieved by the terminal provided in the second aspect, the apparatus provided in the third aspect, the computer-readable storage medium provided in the fourth aspect, the computer program product provided in the fifth aspect, and the chip system provided in the sixth aspect, refer to descriptions about the technical effect in any one of the first aspect or the possible implementations of the first aspect. Details are not described herein again.

BRIEF DESCRIPTION OF DRAWINGS

FIG. 7A-1 and FIG. 7A-2 are a schematic flowchart of another automatic security service switching method according to an embodiment of this application:

DESCRIPTION OF EMBODIMENTS

In descriptions of embodiments of this application, unless otherwise stated, "/" means "or", for example, A/B may represent A or B. The term "and/or" in this specification describes only an association relationship between associated objects, and indicates that three relationships may exist.

For example, A and/or B may represent three cases: Only A exists, both A and B exist, and only B exists.

The following terms "first" and "second" are merely intended for a purpose of description, and shall not be understood as an indication or implication of relative impor- tance or implicit indication of the number of indicated technical features. Therefore, a characteristic limited by "first" or "second" may explicitly or implicitly indicate that one or more characteristics are included. In the descriptions of the embodiments of this application, unless otherwise specified, "a plurality of" means two or more than two.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. To be precise, the word such as "example" or "for example" is intended to present a related concept in a specific manner.

Figure 1:
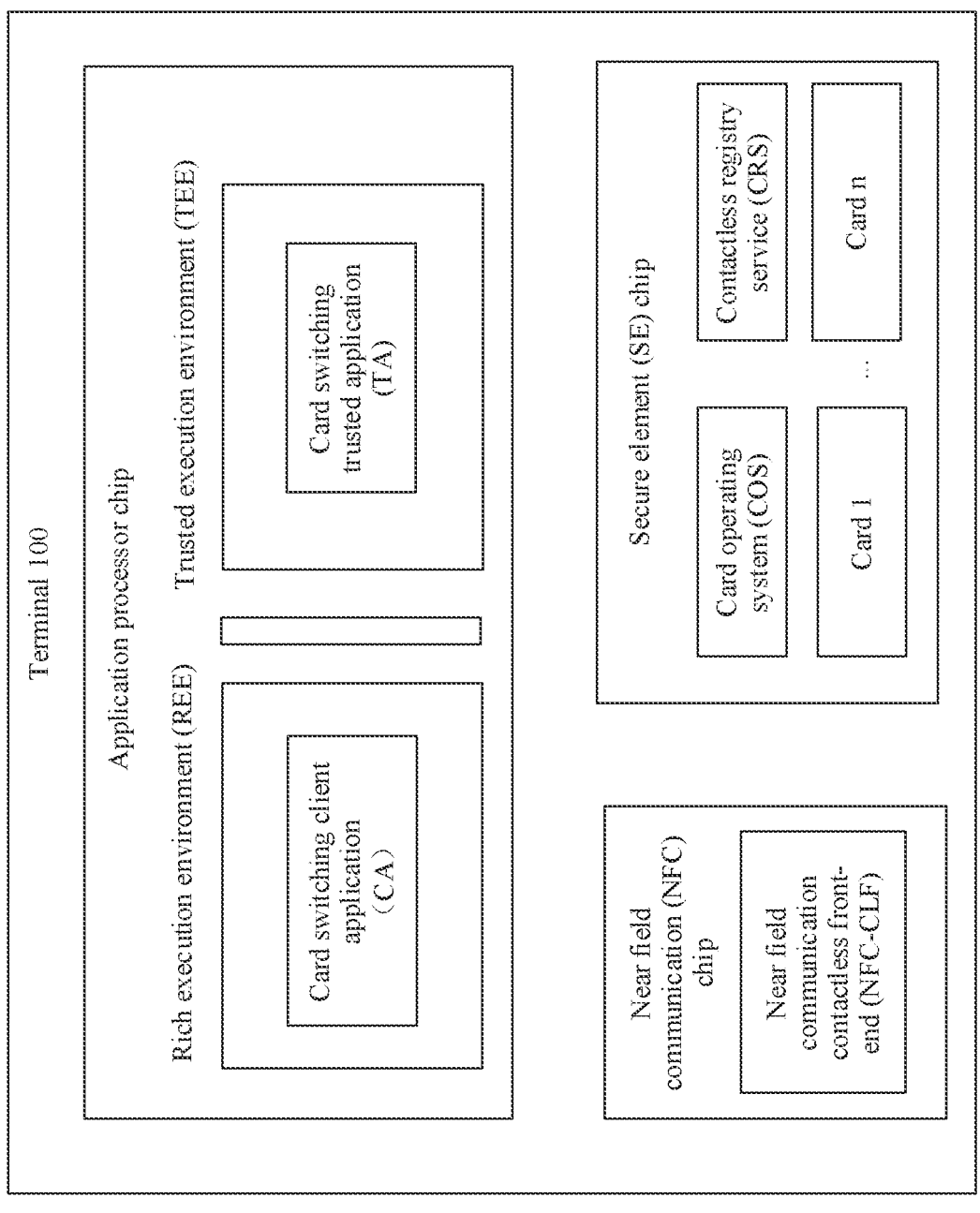
FIG. 1 is a schematic diagram of a structure of a communication system according to an embodiment of this application.

FIG. 1 is a schematic diagram of a structure of a com- munication system according to an embodiment of this application. The communication system includes a terminal 100 and a card reading device 200. For example, the terminal 100 in this embodiment of this application may be, for example, a mobile phone, a tablet computer, a personal computer (personal computer, PC), a personal digital assis- tant (personal digital assistant, PDA), a netbook, a wearable terminal (such as a smartwatch or a smart band), an aug- mented reality (augmented reality, AR) device, a virtual reality (virtual reality, VR) device, an in-vehicle device, a smart screen, an intelligent car, or a smart speaker. A specific form of the terminal 100 is not specifically limited in this application. For example, the card reading device 200 in this embodiment of this application may be, for example, a point of sale (point of sale, POS), a card reader of a bus or a subway, or a card reader of an access control system.

The terminal 100 includes three application environ- ments: a rich execution environment (Rich Execution Envi- ronment. REE) module, a trusted execution environment (Trusted Execution Environment, TEE) module, and a secure element (Secure Element, SE) module. In an example, the REE module and the TEE module are inte- grated into one chip, for example, integrated into an appli- cation processor (Application Processor, AP) chip, and the SE module is integrated into another chip, for example, an SE chip.

The REE module includes a general operating system (not shown in the figure) run on a general-purpose embedded processor, for example, a Rich OS or a kernel-based oper- ating system (such as an Android system or a HarmonyOS), and includes an application/service in the REE module. The application in the REE is referred to as a client application (client application, CA).

The TEE module is an independent running environment running outside the REE module, provides a security service for the REE module, and is isolated from the REE module. The REE module (including a general operating system and an included application) cannot directly access hardware and software resources of the TEE module. The TEE module provides a reliable running environment for an application in the TEE module, and ensures end-to-end security by pro- tecting confidentiality and integrity and controlling data access permissions. The TEE module is parallel to the REE module, and interacts with the REE module through a secure application programming interface (Application Program- ming Interface, API). The TEE module provides a running environment with a security level higher than a security level of the REE module, but cannot provide a secure key storage and key running environment at a hardware isolation level. An application in the TEE module is also referred to as a trusted application (TEE application, TA).

The SE is used to construct a trusted and secure key storage and key calculation environment. A software system in the SE module is simple, and there are relatively few hardware components. Therefore, it is easy to construct physical protection and implement security assurance to improve a security level of the SE module, so that the SE module may serve a security system that requires a higher security level. The SE module includes a card operating system (Chip Operating System. COS) module, a contactless registry service (Contactless Registry service, CRS) module, and an application (for example, a card 1, . . . , a card n in FIG. 1) in the SE module. The COS is an operating system of the SE chip, and is configured to preprocess a received application protocol data unit (Application Protocol Data Unit, APDU) instruction, and distribute the instruction to a corresponding service or application in the SE for process- ing. The CRS is a system application in the SE module, and is responsible for registration management of an application in the SE module, and activation or deactivation (that is, activation canceling) of the application in the SE module. The application in the SE module may also be referred to as an Applet or a card, for example, may be one or more of a bank card, a bus card, an access control card, an employee identity card, an electronic certificate, a vehicle key, and typical support (such as Alipay™ and WeChat Pay™).

It should be noted that, the terminal 100 separately deploys corresponding applications in the three layers of application environments based on security levels of differ- ent data in the security service. In other words, correspond- ing applications may be separately deployed in the REE module, the TEE module, and the SE module for the security service. The automatic security service switching method provided in this application also relates to the card switching CA deployed in the REE module, the card switching TA deployed in the TEE module, and a corresponding service or application (for example, various cards in the COS, the CRS, and the SE) in the SE module. In a specific embodiment, the card switching CA may be an application of a wallet application deployed in the REE module, the card switching TA may be an application of the wallet application deployed in the TEE module, and various cards in the SE module may be various cards of the wallet application deployed in the SE module, such as a bank card, a transportation card, an electronic certificate, change, a member card, an invoice, a community access control card, a smart home lock card, and a smart hotel room card. Specific functions of the modules are described in subsequent specific embodiments.

It should be further noted that "card switching CA", "card switching TA", and "card switching Applet" herein are names provided in this application for ease of solution description, and cannot be used as a limitation on functions of the solutions in this application in some examples.

As shown in FIG. 1, the terminal 100 further includes an NFC module, configured to support the terminal 100 in communicating with another NFC device (for example, the card reading device 200). The NFC module includes a contactless front-end (Contactless Front-End, CLF), is a controller of the NFC module, and may receive an APDU instruction of the card reading device 200, and send the received APDU instruction to the COS in the SE chip, so that the COS distributes the received APDU instruction to a corresponding application in the SE module for a service transaction. Optionally, the CLF may also assemble an APDU instruction. In an example, the NFC module may be integrated into another chip independent of the AP chip and the SE chip, and is also referred to as an NFC chip.

In some embodiments of this application, the REE module of the terminal 100 determines, based on a card type added by the user, a list of cards that allow automatic card switching, namely, a whitelist; or the REE module of the terminal 100 receives a whitelist set by the user. Then, the REE module separately sends the whitelist to the SE module and the NFC module of the terminal 100. When the terminal 100 approaches the card reading device 200, the NFC module of the terminal 100 receives an instruction that is for selecting a first card and that is sent by the card reading device 200. The NFC module of the terminal 100 routes, to the SE module of the terminal 100, the instruction that is for selecting the first card. If the SE module determines that the first card is in an inactive state, the SE module returns to the NFC module, a response indicating that the first card is not selected. After receiving the response indicating that the first card is not selected, the NFC module determines whether the first card is in the whitelist for allowing automatic card switching. When the NFC module determines that the first card is in the whitelist, the NFC module sends, to the SE module, an instruction that is for activating the first card. After receiving the instruction that is for activating the first card, the SE module performs security check. For example, the SE module determines whether the first card is in the whitelist for allowing automatic card switching. If the first card is not in the whitelist, the SE module does not activate the first card. If the first card is in the whitelist, the SE module activates the first card. Herein, an example in which the first card is in the whitelist is used for further description. It should be noted that the card reading device 200 continuously sends the instruction that is for selecting the first card. Therefore, the terminal 100 receives again the instruction that is for selecting the first card and that is sent by the card reading device 200. After the terminal 100 receives the instruction that is for selecting the first card again, the NFC module of the terminal 100 routes, to the SE module of the terminal 100, the instruction that is for selecting the first card. In this case, if the SE module determines that the first card is activated, the SE module forwards, to the first card, the instruction that is for selecting the first card, and then the card reading device 200 performs a transaction with the first card in the SE. Therefore, the terminal 100 implements an automatic card switching function.

In the foregoing embodiment, after receiving the response indicating that the first card is not selected from the first card, the NFC module triggers an action of activating the first card. In some other embodiments, after the SE module determines that the first card is in the inactive state, the SE module may also automatically trigger an action of activating the first card. In some examples, the REE module of the terminal 100 determines, based on a card type added by the user, a list of cards that allow automatic card switching, namely, a whitelist; or the REE module of the terminal 100 receives a whitelist set by the user. Then, the REE module sends the whitelist to the SE module of the terminal 100. In this case, after the SE module receives an instruction that is for selecting the first card and that is forwarded by the NFC module, when the SE module determines that the first card is in an inactive state, the SE module returns, to the NFC module, a response indicating that the first card is not selected, and performs security check. For example, the SE module determines whether the first card is in the whitelist. If the first card is not in the whitelist, the SE module does not activate the first card. If the SE module determines that the first card is in the whitelist, the SE module automatically activates the first card. Herein, an example in which the first card is in the whitelist is used for further description. On the NFC module side, after receiving the response that is returned by the SE module and that indicates that the first card is not selected, the NFC module sends, to the SE module again, the instruction that is for selecting the first card. In this case, after receiving the instruction that is for selecting the first card, the SE module determines that the first card is activated. Similarly, after the terminal 100 receives the instruction that is for selecting the first card again, the NFC module of the terminal 100 routes, to the SE module of the terminal 100, the instruction that is for selecting the first card. In this case, if the SE module determines that the first card is activated, the SE module forwards, to the first card, the instruction that is for selecting the first card, and then the card reading device 200 performs a transaction with the first card in the SE. Therefore, the terminal 100 implements an automatic card switching function.

In some other examples, the REE module of the terminal 100 determines, based on a card type added by the user, a list of cards that allow automatic card switching, namely, a whitelist; or the REE module of the terminal 100 receives a whitelist set by the user. Then, the REE module sends the whitelist to the SE module of the terminal 100. In this case, after the SE module receives an instruction that is for selecting the first card and that is forwarded by the NFC module, and determines that the first card is in the inactive state, the SE module further determines whether the first card is in the whitelist. If the SE module determines that the first card is in the whitelist, the SE module automatically activates the first card, and returns, to the NFC module, a first response (for example, a customized response) indicating that the first card is not selected. If the first card is not in the whitelist, the SE module does not activate the first card, and returns, to the NFC module, a second response indicating that the first card is not selected (for example, a standard response indicating that a card is not selected). On the NFC module side, if the NFC module receives the first response that is returned by the SE module and that indicates that the first card is not selected, the NFC module determines that the first card is a card in the whitelist. If the NFC module receives a second response that is returned by the SE module and that indicates that the first card is not selected, the NFC module determines that the first card is not a card in the whitelist, and executes service logic of non-automatic card switching. Herein, an example in which the first card is in the whitelist is used for further description. Similarly, after the terminal 100 receives the instruction that is for selecting the first card again, the NFC module of the terminal 100 routes, to the SE module of the terminal 100, the instruction that is for selecting the first card. In this case, if the SE module determines that the first card is activated, the SE module forwards, to the first card, the instruction that is for selecting the first card, and then the card reading device 200 performs a transaction with the first card in the SE. Therefore, the terminal 100 implements an automatic card switching function.

Figure 2:
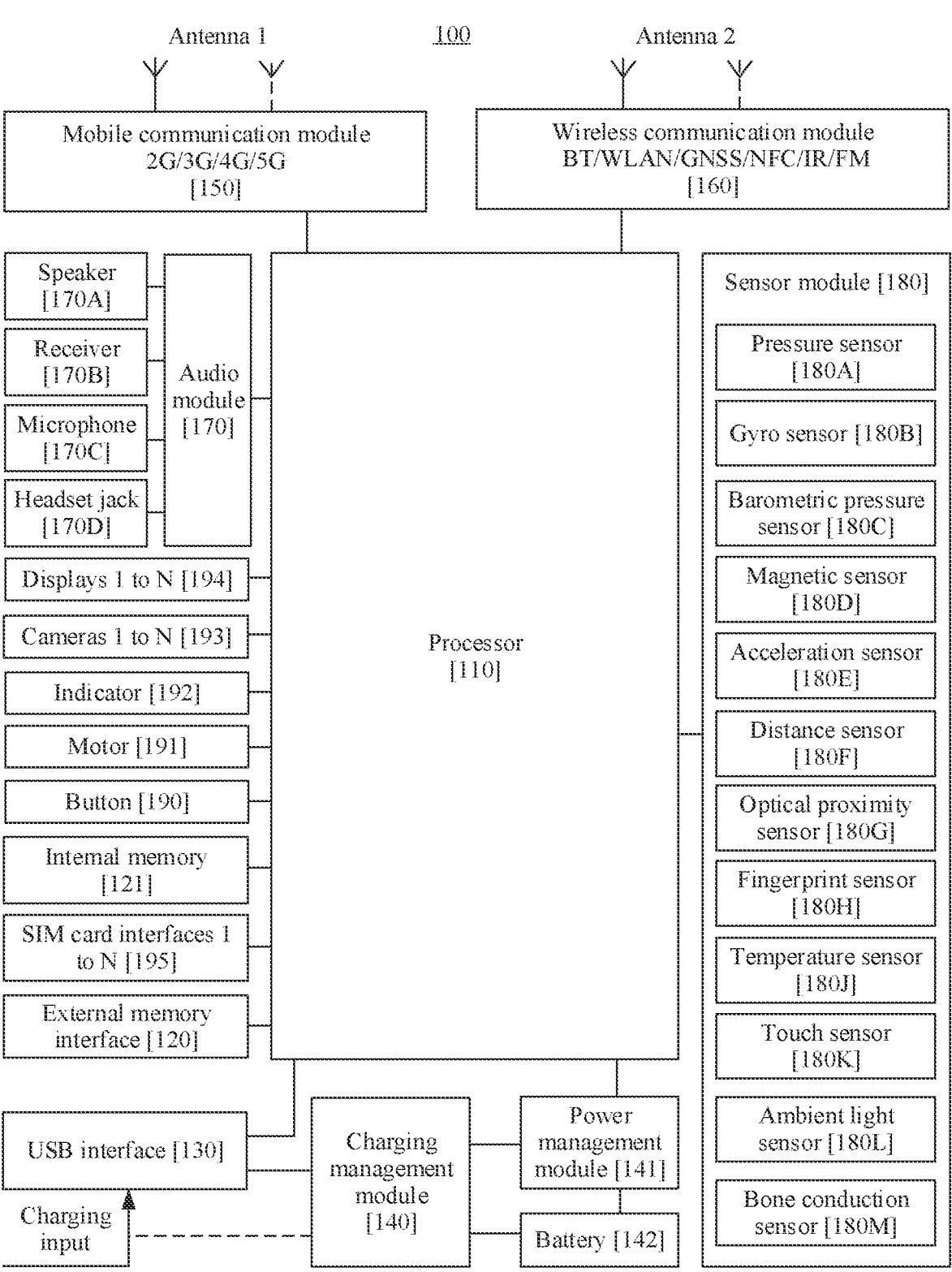
FIG. 2 is a schematic diagram of a structure of a terminal according to an embodiment of this application.

FIG. 2 is a schematic diagram of a structure of the terminal 100.

A terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor. AP), a modem processor, a graphics processing unit (graphics processing unit, GPU), an image signal processor (image signal processor, ISP), a controller, a video codec, a digital signal processor (digital signal processor. DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

The charging management module 140 is configured to receive charging input from a charger. The charger may be a wireless charger or a wired charger. In some embodiments of wired charging, the charging management module 140 may receive charging input of a wired charger through the USB interface 130. In some embodiments of wireless charging, the charging management module 140 may receive a wireless charging input by using a wireless charging coil of the terminal 100. When charging the battery 142, the charging management module 140 may further supply power to the terminal by using the power management module 141.

The power management module 141 is configured to connect to the battery 142, the charging management module 140, and the processor 110. The power management module 141 receives input of the battery 142 and/or the charging management module 140, and supplies power to the processor 110, the internal memory 121, the display 194, the camera 193, the wireless communication module 160, and the like. The power management module 141 may be further configured to monitor a parameter such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the terminal 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal 100 may be configured to cover one or more communication frequency bands. Different antennas may be multiplexed to improve antenna utilization. For example, the antenna 1 may be multiplexed as a diversity antenna in a wireless local area network. In some other embodiments, the antennas may be used in combination with a tuning switch.

The mobile communication module 150 may provide a wireless communication solution applied to the terminal 100, including 2G, 3G, 4G, 5G, or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert, by using the antenna 1, the signal into an electromagnetic wave for radiation. In some embodiments, at least some functional modules in the mobile communication module 150 may be disposed in the processor 110. In some embodiments, at least some function modules of the mobile communication module 150 may be disposed in a same device with at least some modules of the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low frequency baseband signal obtained through demodulation to the baseband processor for processing. After being processed by the baseband processor, the low-frequency baseband signal is transmitted to the application processor. The application processor outputs a sound signal by using an audio device (not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communication module 150 or another function module.

The wireless communication module 160 may provide a wireless communication solution that is applied to the terminal 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the to-be-sent signal, and convert, by using the antenna 2, the signal into an electromagnetic wave for radiation.

In some embodiments, the antenna 1 of the terminal 100 is coupled to the mobile communication module 150, and the antenna 2 is coupled to the wireless communication module 160, so that the terminal 100 may communicate with a network and another device by using a wireless communication technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution. LTE). BT, a GNSS, a WLAN, NFC, FM, an IR technology, and/or the like. The GNSS may include a global positioning system (global positioning system, GPS), a global navigation satellite system (global navigation satellite system, GLONASS), a Bei-Dou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal 100 may implement a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, and the GPUs execute program instructions to generate or change display information.

The terminal 100 may implement an image shooting function by using the ISP, the camera 193, the video codec, the GPU, the display 194, the application processor, and the like.

The external memory interface 120 may be used to connect to an external memory card, for example, a micro SD card, to extend a storage capability of the terminal 100. The external memory card communicates with the processor 110 by using the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data and a phone book) and the like created when the terminal 100 is used. In addition, the internal memory 121 may include a high-speed random access memory, and may further include a non-volatile memory, for example, at least one magnetic disk storage device, a flash memory device, a universal flash storage (universal flash storage, UFS), or the like. The processor 110 runs instructions stored in the internal memory 121 and/or instructions stored in the memory disposed in the processor, to perform various function applications and data processing of the terminal 100.

The terminal 100 may implement audio functions such as music playing and recording by using the audio module 170, the speaker 170A, the receiver 170B, the microphone 170C, the headset jack 170D, the application processor, and the like.

Figure 3A:
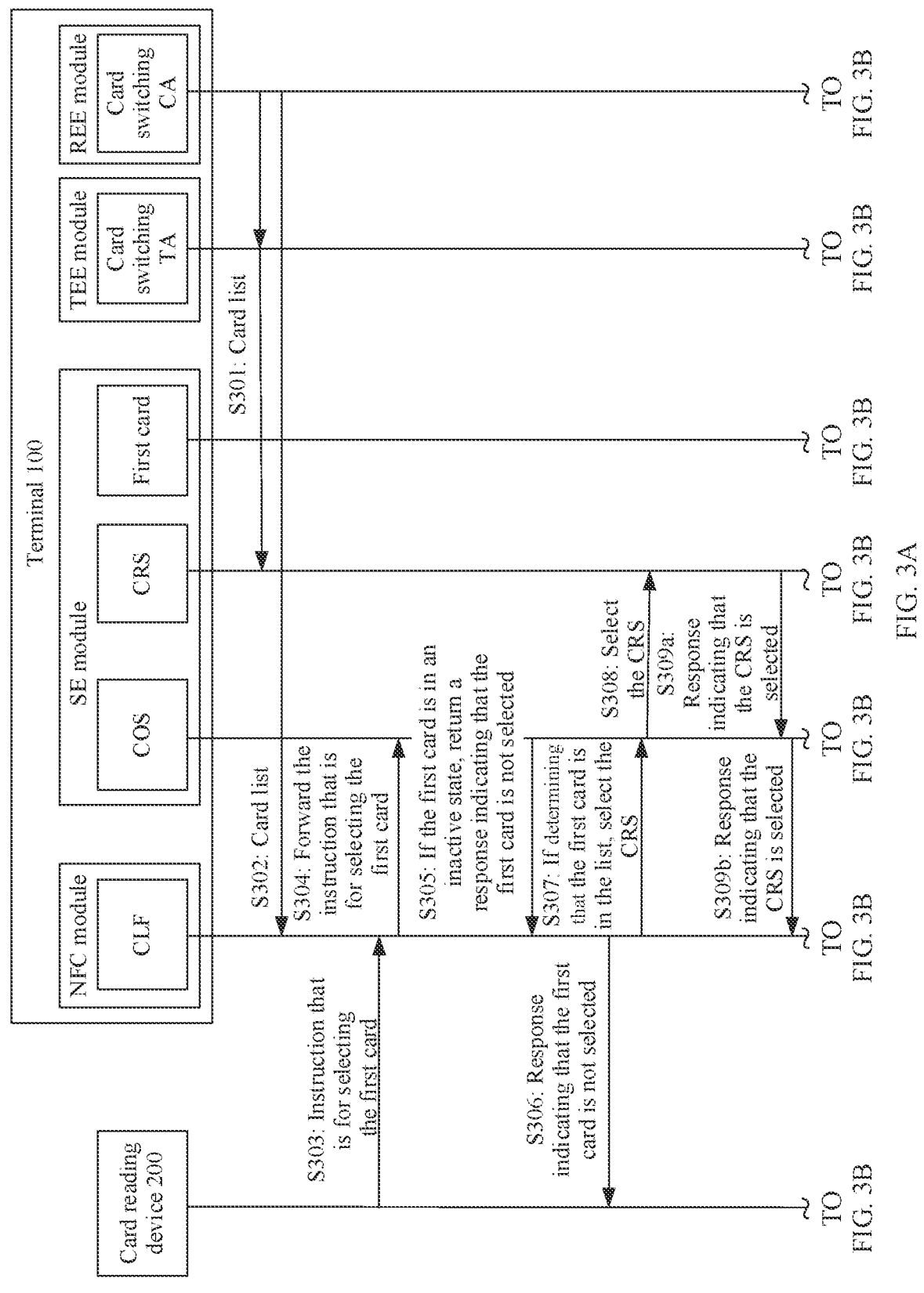
FIG. 3A and FIG. 3B are a schematic flowchart of an automatic security service switching method according to an embodiment of this application.
Figure 3B:
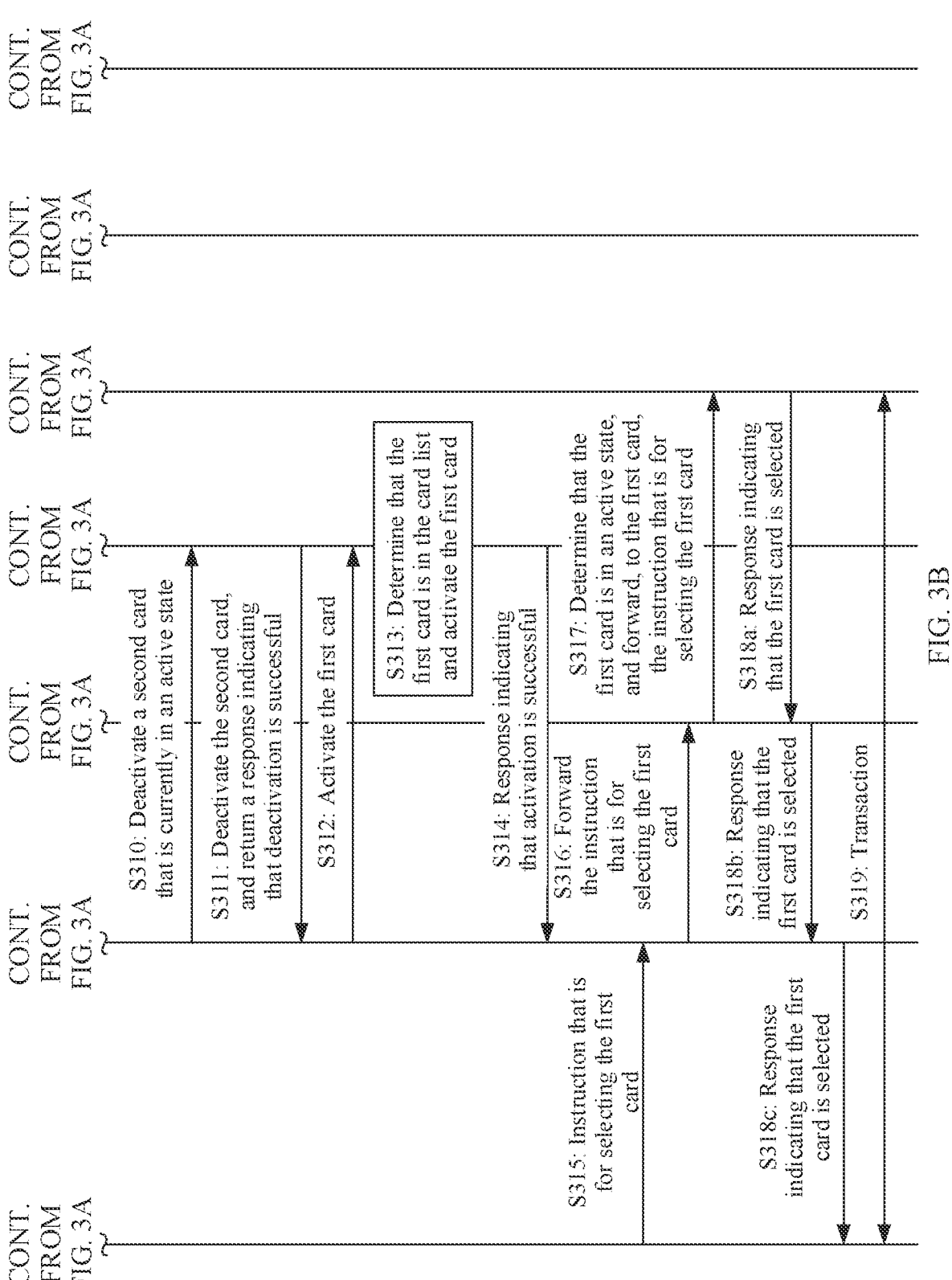

The following describes in detail the technical solutions provided in embodiments of this application with reference to the software structure of the terminal 100 shown in FIG. 1. FIG. 3A and FIG. 3B are a schematic flowchart of an automatic security service switching method according to an embodiment of this application. The method includes the following steps.

S301: A card switching CA sends, to a CRS in an SE module by using a card switching TA, a list (namely, a whitelist) of cards that allow automatic card switching, where the card list includes information about one or more cards.

In some examples, when a user indicates the terminal 100 to enable an automatic card switching function, or the terminal 100 automatically enables the automatic card switching function, or information about a card that allows automatic card switching in the terminal 100 is changed (for example, the user adds or deletes the card that allows automatic card switching), the card switching CA sends the card list to the CRS in the SE module by using the card switching TA. In this example, the card list may include information about all cards that are added by the user to the terminal 100 and that allow automatic card switching. In an example, the terminal 100 may set, by default, a card that does not need to be verified by the user as a card that allows automatic card switching, for example, a transportation card, an access control card (or specifically an access control card in a non-security area), a key (for example, a vehicle key or a key of an intelligent lock), a bank card (which is limited to a verification-free small-amount payment function), or an electronic certificate. In another example, the user may alternatively set whether a card allows automatic card switching.

Figure 4:
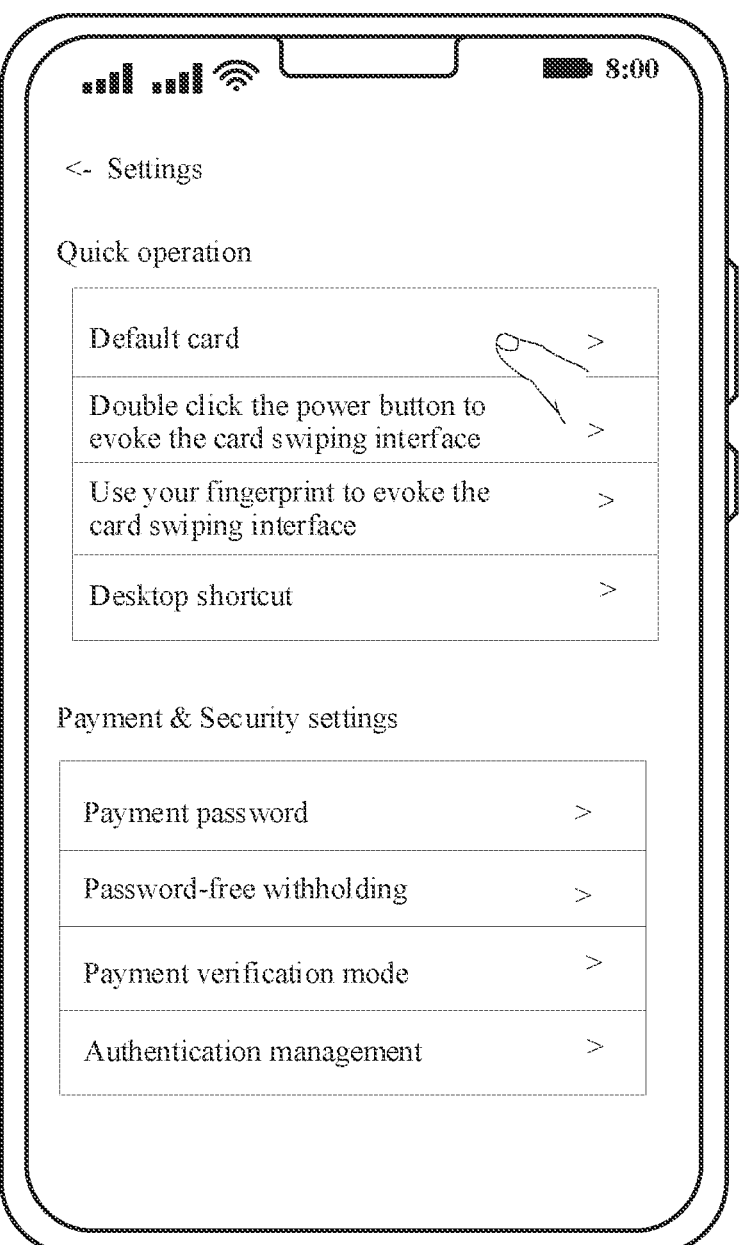
FIG. 4(1) to FIG. 4(3) are a schematic diagram of some user interfaces of a terminal according to an embodiment of this application.
Figure 4:
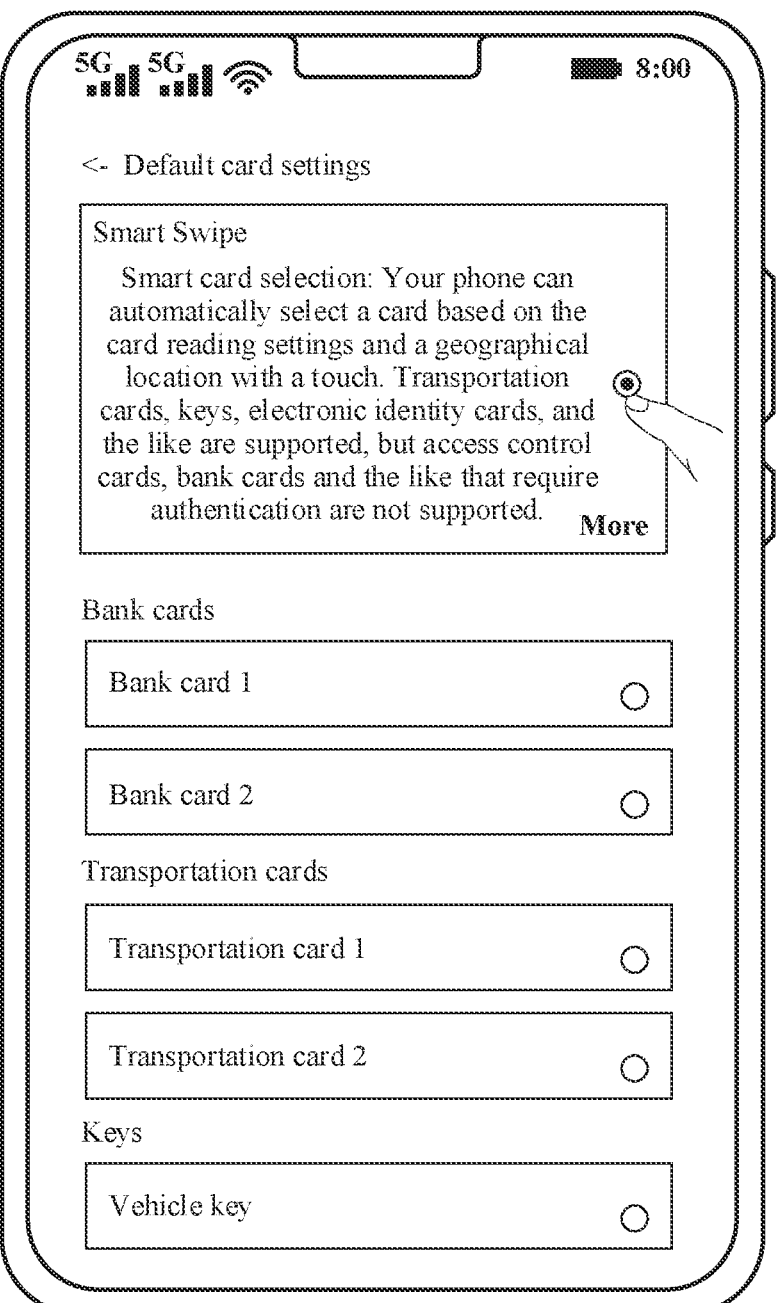
Figure 4:
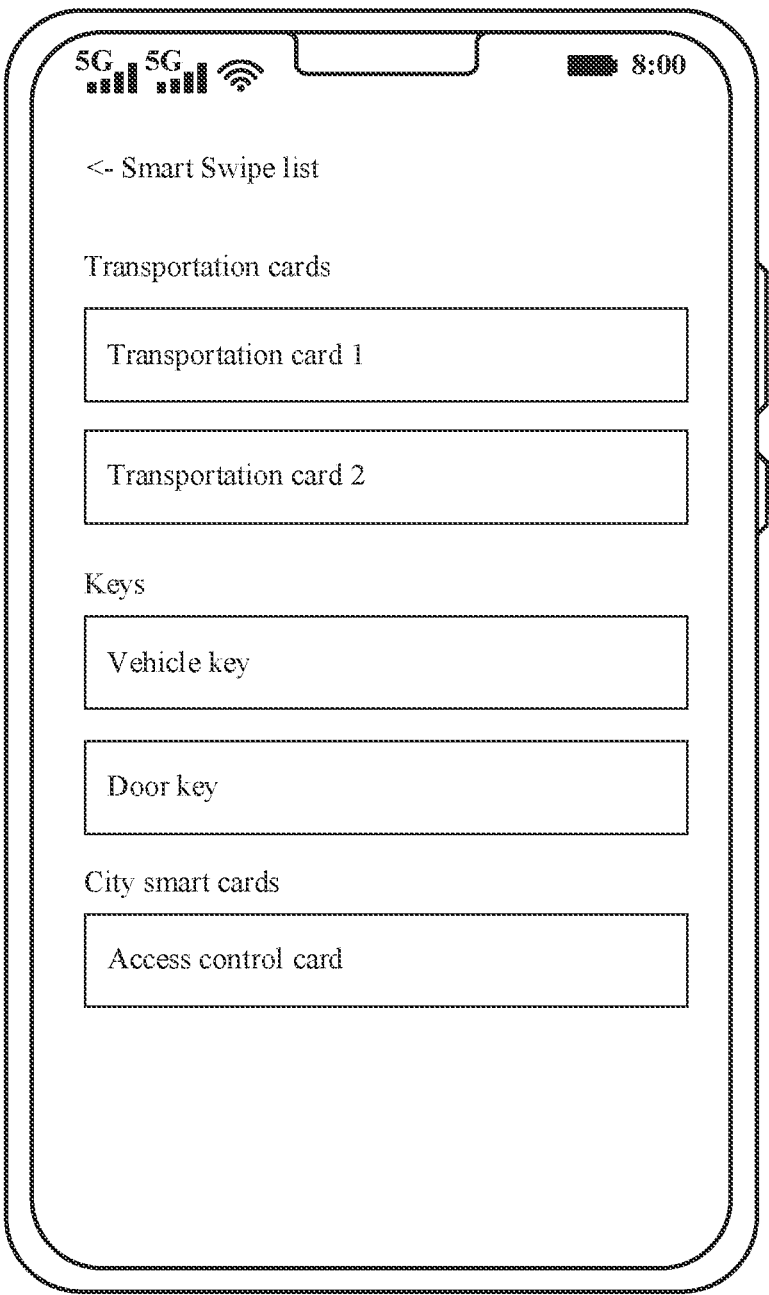

For example, a wallet application installed on the terminal 100 is used as an example for description. FIG. 4(1) shows a settings interface of the wallet application displayed by the terminal 100. The settings interface includes a default card setting option. In response to detecting that the user operates the default card setting option, the terminal 100 displays a default card settings interface shown in FIG. 4(2). The default card settings interface includes Smart Swipe and various cards that have been added to the wallet application. It should be noted that a default card is a card activated by the terminal 100 by default. Smart Swipe can automatically identify scenarios based on conditions such as geographical locations and card reading devices, and automatically activate a corresponding card, that is, implement an automatic card switching function. For example, when it is detected that the user sets a transportation card 1 as the default card, the terminal 100 activates the transportation card 1 by default, and another card is in an inactive state. When the user needs to use another card, for example, a transportation card 2, the user needs to manually switch to the transportation card 2, that is, manually activate the transportation card 2. For another example, after it is detected that the user sets Smart Swipe as the default card, the card switching CA (that is, an application of the wallet application in an REE) of the terminal 100 sends a card list to the CRS in the SE module. The card list includes information about all cards that have been added to the wallet application and that allow automatic card switching. In other words, in this case, the terminal 100 has enabled the automatic card switching function. In other words, when the terminal 100 receives an instruction that is for selecting the transportation card 1 and that is sent by the card reading device 200, the terminal 100 may automatically activate the transportation card 1. When the terminal 100 receives an instruction that is for selecting the vehicle key and that is sent by another card reading device 200, the terminal 100 may automatically activate the vehicle key, to implement automatic switching. In response to detecting that the user operates a "More" control in a Smart Swipe setting option in the interface shown in FIG. 4(2), the terminal 100 displays an interface shown in FIG. 4(3). The interface includes information about cards that allow automatic card switching, for example, a transportation card, a vehicle key, and an access control card. In some other examples, the interface shown in FIG. 4(3) may also provide an editing control, so that the user sets a card that allows automatic card switching, and the like. It may be understood that the terminal 100 may also provide another interface for the user to enable the automatic card switching function. An operation manner of enabling the automatic card switching function by the terminal 100 is not specifically limited herein.

In some other examples, after the terminal 100 enables the automatic card switching function for the first time, the card switching CA sends the card list to the CRS in the SE module by using the card switching TA in a TEE module. In this case, the card list may include information about all cards that have been added to the card switching CA and that allow automatic card switching. Subsequently, when information about a card that allows automatic card switching in the terminal 100 is changed (for example, the user adds or deletes the card that allows automatic card switching), the card switching CA may send, to the CRS, information about a changed card, so that the CRS updates the information about a card that allows automatic card switching. For example, when the user adds a card 1 that allows automatic card switching, the card switching CA sends information about the card 1 to the CRS in the SE module by using the card switching TA in the TEE module, and indicates the CRS to add the information about the card 1 to the list of cards that allow automatic card switching. For another example, when the user deletes a card 2 that allows automatic card switching, the card switching CA sends information about the card 2 to the CRS in the SE module by using the card switching TA in the TEE module, and indicates the CRS to delete the information about the card 2 from the list of cards that allow automatic card switching. Certainly, the user may alternatively manually change information, in the terminal 100, about a card that allows automatic card switching.

In still some other examples, statistics about whether automatic card switching is allowed for all cards in the market may be collected in advance, and a list of cards that allow automatic card switching is preset in the CRS in the terminal 100. It may be understood that the card that is preset in the CRS and that allows automatic card switching may include a card that has been added to the terminal 100, or may include a card that has not been added to the terminal 100. In this example, step S301 may not be performed.

Therefore, the CRS in the SE module stores the list of cards that allow automatic card switching. Subsequently, the CRS may perform, based on the card list, security check on a card that requests to be activated.

It should be noted that, after receiving the card list or another instruction that is for updating a card that allows automatic card switching, the CRS in the SE module may first determine whether the instruction is from the TEE module, or more specifically, from a specific TA in the TEE module, for example, the card switching TA. If the instruction is from the TEE module, or more specifically from the specific TA in the TEE module, for example, the card switching TA, the CRS stores the card list in the instruction, or updates the card list based on the instruction. In this way, another malicious application is prevented from sending a forged card list to the SE module, and a card is prevented from being maliciously activated, improving card transaction security in the SE module.

S302: The card switching CA sends the card list to an NFC module, where the card list includes information about one or more cards.

In some examples, when the user indicates the terminal 100 to enable the automatic card switching function, or the terminal 100 automatically enables the automatic card switching function, or information about a card that allows automatic card switching in the terminal 100 is changed (for example, the user adds or deletes the card that allows automatic card switching), the card switching CA sends the card list to the NFC module (for example, more specifically, a CLF module). Alternatively, the switching CA periodically sends the card list to the NFC module (for example, more specifically, the CLF module). In this example, the card list may include information about all cards that have been added to the card switching CA and that allow automatic card switching.

In some other examples, after the terminal 100 enables the automatic card switching function for the first time, the card switching CA sends the card list to the NFC module. In this case, the card list may include all cards that have been added to the card switching CA and that allow automatic card switching. Subsequently, when information about a card that allows automatic card switching in the terminal 100 is changed (for example, the user adds or deletes the card that allows automatic card switching), the card switching CA may send information about a changed card to the NFC module, so that the NFC module updates the information about the card that allows automatic card switching.

In still some other examples, statistics about whether automatic card switching is allowed for all cards in the market may be collected in advance, and a list of cards that allow automatic card switching is preset in the NFC module in the terminal 100. In this example, step S302 may not be performed.

For other content, refer to the content descriptions in step S301. Details are not described herein again.

Therefore, the NFC module stores a list of cards that allow automatic card switching. Subsequently, the NFC module may request, based on the card list, the SE module to activate a corresponding card, to implement the automatic card switching function.

It should be noted that step S302 may be performed simultaneously with step S301, or may be performed before step S301, or may be performed after step S301. A sequence of performing step S301 and step S302 is not limited in this application.

In addition, it should be noted that step S301 and step S302 are related to the REE module and the TEE module of the terminal 100. Because the terminal 100 can enable the REE module only when being powered on, the terminal 100 can perform the foregoing step S301 and step S302 only when being powered on. The following step S303 to step S319 are related to only the NFC module and the SE module of the terminal 100, and not related to the REE module and the TEE module. When the terminal 100 is powered off, remaining power of the terminal 100 may supply power to the NFC module and the SE module of the terminal 100, that is, the NFC module and the SE module of the terminal 100 may still work. In other words, when the terminal 100 is powered off, the terminal 100 may still perform the following step S303 to step S319. In other words, when the terminal 100 is powered on or powered off the following step S303 to step S319 may be performed.

S303: The NFC module receives an instruction that is for selecting a first card and that is sent by a card reading device 200.

It may be learned from a protocol of the global platform (Global Platform. GP) related to the TEE/SE field that the card reading device 200 continuously sends the instruction that is for selecting the first card. The instruction that is for selecting the first card includes an application identifier (application ID, AID) of the first card, and is used to identify a card type of the first card. When the terminal 100 approaches the card reading device 200, the NFC module in the terminal 100 may receive the instruction that is for selecting the first card and that is sent by the card reading device 200. For example, a card reader (namely, the card reading device 200) of a bus periodically sends an instruction that is for selecting a transportation card (which is a card type). When the user puts a mobile phone (namely, the terminal 100) close to the card reader, the mobile phone receives the instruction that is for selecting the transportation card and that is sent by the card reader.

S304: The NFC module forwards, to the COS in the SE module, the instruction that is for selecting the first card.

The NFC module routes, to the COS in the SE module, the received instruction that is for selecting the first card.

S305: If determining that the first card is in an inactive state, the COS returns, to the NFC module, a response indicating that the first card is not selected.

In some examples, the terminal 100 may support activation of one card, or support simultaneous activation of a plurality of cards. In an example, the terminal 100 supports activation of one card. When the terminal 100 is powered on, if another card (for example, a second card) is activated and used previously, the first card is in an inactive state. When the terminal 100 is powered off, if the terminal 100 activates and uses the another card (for example, the second card) before the terminal 100 is powered off, the first card is in an inactive state.

If the COS determines that the first card is in an active state, the COS forwards, to the first card, the instruction that is for selecting the first card. That is, step S317 and subsequent steps are performed.

S306: After receiving the response indicating that the first card is not selected, the NFC module returns, to the card reading device 200, the response indicating that the first card is not selected.

S307: After the NFC module receives the response indicating that the first card is not selected, the NFC module determines whether the first card is in the card list. If determining that the first card is in the card list, the NFC module sends, to the COS, an instruction that is for selecting the CRS. The instruction that is for selecting the CRS instructs the NFC module to subsequently send a deactivation instruction and an activation instruction to the CRS.

It may be understood that, as described in step S302, the NFC module stores the list of cards that allow automatic card switching. In this case, after the NFC module receives the response indicating that the first card is not selected, the NFC may query the list of cards that allow automatic card switching, for example, a Smart Swipe list shown in FIG. 4(3), to determine whether the first card allows automatic card switching. If the first card is in the list of cards that allow automatic card switching, and the NFC module determines that the first card allows automatic card switching, the NFC module triggers an action of automatically activating the first card, that is, selects the CRS and indicates the CRS to activate the first card.

In some other embodiments, if the NFC module determines that the first card is not in the card list, the first card is a card that does not allow automatic card switching, and therefore the NFC module cannot automatically activate the first card. For example, if the terminal 100 is in a power-on state, the NFC module may interact with the REE module, and the REE module prompts the user to manually activate the first card (for example, the REE module prompts the user to select a card, and indicates, by using the TEE module, the SE module to activate the card selected by the user), or the REE module requests, by using the TEE module, the user to perform authentication, activates the first card after the authentication succeeds (for example, the REE module automatically selects a corresponding card, for example, a bank card, and then prompts the user to enter a fingerprint, a face, or the like for authentication, and the TEE module indicates the SE module to activate the card after the authentication succeeds), and the like, to finally complete the transaction.

It should be noted that step S307 may be performed simultaneously with step S306, or may be performed before step S306, or may be performed after step S307. A sequence of performing step S306 and step S307 is not limited in this application. In some other examples, step S306 may not be performed.

S308: The COS forwards, to the CRS, the instruction that is for selecting the CRS.

S309a: The CRS returns, to the COS, a response indicating that the CRS is selected.

S309b: The COS forwards, to the NFC module, the response indicating that the CRS is selected.

S310: The NFC module sends, to the CRS, an instruction that is for deactivating (deactivating) the second card that is currently in an active state. Deactivating (deactivating) the second card is to cancel the active state of the second card, so that the second card is in an inactive state.

It should be noted that different cards may have different contactless parameter settings. The contactless parameter is a communication parameter used when each card in the SE module communicates with the card reading device 200 by using the NFC module. In other words, when a conflict exists in contactless parameter activation of two or more cards, these cards cannot be activated simultaneously. In some examples, to avoid a failure in subsequently activating the first card, the NFC module may send, to the CRS, an instruction that is for deactivating all cards currently in the active state, that is, the second card indicates all cards currently in the active state. In some other examples, the NFC module may alternatively determine whether there are cards that are in the currently activated cards conflict with the first card to be activated, and deactivate only these cards that conflict with the first card to be activated. In other words, the second card is a card that conflicts with a contactless parameter for activating the first card.

Certainly, in some other examples, the NFC module may alternatively send a deactivation instruction to the CRS by using the COS. The COS or the CRS determines whether there are cards that are in the currently activated cards conflict with the first card to be activated, and deactivates only these cards that conflict with the first card to be activated. This is not specifically limited in this embodiment of this application.

S311: The CRS deactivates the second card, and returns, to the NFC, a response indicating that deactivation is successful.

The CRS returns, to the NFC module by using the COS, the response indicating that the CRS is selected.

S312: The NFC module sends, to the CRS, the instruction that is for activating the first card.

The NFC module sends, to the CRS by using the COS, the instruction that is for activating the first card.

S313: The CRS determines whether the first card is in the card list. If the first card is in the card list, the first card is a card that allows automatic card switching, and the CRS activates the first card.

In this application, the CRS may perform security check on the card activation instruction from the NFC module based on the pre-stored list of cards that allow automatic card switching. As described in step S301, the CRS obtains the list of cards allow automatic card switching. It should be emphasized that the CRS stores only a list of cards that allow automatic card switching from the TEE module (for example, the card switching TA), to ensure card transaction security. If the first card is in the card list, the first card is a card that allows automatic card switching, and the CRS activates the first card. If the first card is not in the card list, the CRS does not activate the first card. Subsequent steps are described by using an example in which the first card is in the list of cards that allow automatic card switching.

S314: The CRS returns, to the NFC module, a response indicating that the first card is successfully activated.

The CRS returns, to the NFC module by using the COS, the response indicating that the first card is successfully activated.

S315: The NFC module receives the instruction that is for selecting the first card and that is sent by the card reading device 200.

As described above, if the card reading device 200 continuously sends the instruction that is for selecting the first card, the NFC module of the terminal 100 receives again the instruction that is for selecting the first card and that is sent by the card reading device 200.

S316: The NFC module forwards, to the COS in the SE module, the instruction that is for selecting the first card.

The NFC module routes, to the COS in the SE module, the received instruction that is for selecting the first card.

S317: If the COS determines that the first card is in an active state, the COS forwards, to the first card, the instruction that is for selecting the first card.

Because the first card has been activated in step S313, in this step, the COS can determine that the first card is in an active state.

S318: The first card returns, to the card reading device 200, a response indicating that the first card is selected.

This step is shown in step S318a, step S318b, and step S318c in the figure.

S319: The card reading device 200 starts a transaction with the first card in the terminal 100.

In conclusion, in this embodiment, the NFC module triggers the action of automatically activating the first card, and the CRS in the SE module performs security check on the action of activating the first card, to implement a function of automatically activating the first card.

The following provides descriptions with reference to a specific scenario. For example, when a mobile phone is powered on, the user sets a default card as Smart Swipe. The mobile phone separately sends a list for allowing automatic card switching to the NFC module and the SE module. Subsequently, the mobile phone may automatically switch a card based on a selection instruction of the card reading device 200. For example, the user takes a bus and uses the mobile phone to approach a card reader of a bus. In this case, the mobile phone receives an instruction that is for selecting a transportation card and that is sent by the card reader of the bus, and the mobile phone automatically switches to the transportation card based on the instruction, that is, activates the transportation card. If the mobile phone is powered off (the user powers off the mobile phone or the mobile phone automatically powers off), the transportation card in the mobile phone is in an active state, and another card is in an inactive state. When the user arrives at an office, the user holds the mobile phone close to an access control card reader, and the mobile phone receives, by using the NFC module, an instruction that is for selecting an access control card and that is sent by the access control card reader. In this case, the NFC module forwards, to the COS in the SE module, the instruction that is for selecting the access control card. In this case, the access control card is in an inactive state. The COS returns, to the NFC module, a response indicating that the card is not selected. After receiving the response indicating that the card is not selected, the NFC module determines whether the access control card is a card that allows automatic card switching. After the NFC module determines that the access control card is a card that allows automatic card switching, the NFC module sends, to the CRS in the SE module, an instruction that is for deactivating the transportation card and an instruction that is for activating the access control card. After determining that the access control card is a card that allows automatic card switching, the CRS deactivates the transportation card and activates the access control card. After the mobile phone receives again, by using the NFC module, the instruction that is for selecting the access control card and that is sent by the access control card reader, the access control card of the mobile phone performs a transaction with the access control card reader.

It may be learned that in this application, an entire automatic card switching path is in the NFC module and the SE module, and does not pass through the REE module and the TEE module. Therefore, in this application, a speed of automatic card switching is accelerated. In addition, it should be noted that, when the terminal 100 is powered off, remaining power of the terminal 100 may supply power to the NFC module and the SE module of the terminal 100, that is, the NFC module and the SE module of the terminal 100 may still work, and automatic card switching may still be implemented. In other words, when the terminal 100 is powered off, automatic card switching of the terminal 100 may still be implemented in this application. In addition, compared with the conventional technology, this embodiment is related to only modification of system applications in the NFC module and the SE module, and a modification workload is small.

In addition, compared with the conventional technology, in the embodiment shown in FIG. 3A and FIG. 3B, service logic of the NFC module of the terminal 100 and service logic of the CRS in the SE module are correspondingly modified. For example, compared with the conventional technology, step S301, step S302, step S307, step S310, step S312, step S313, and the like are added.

Figure 5A:
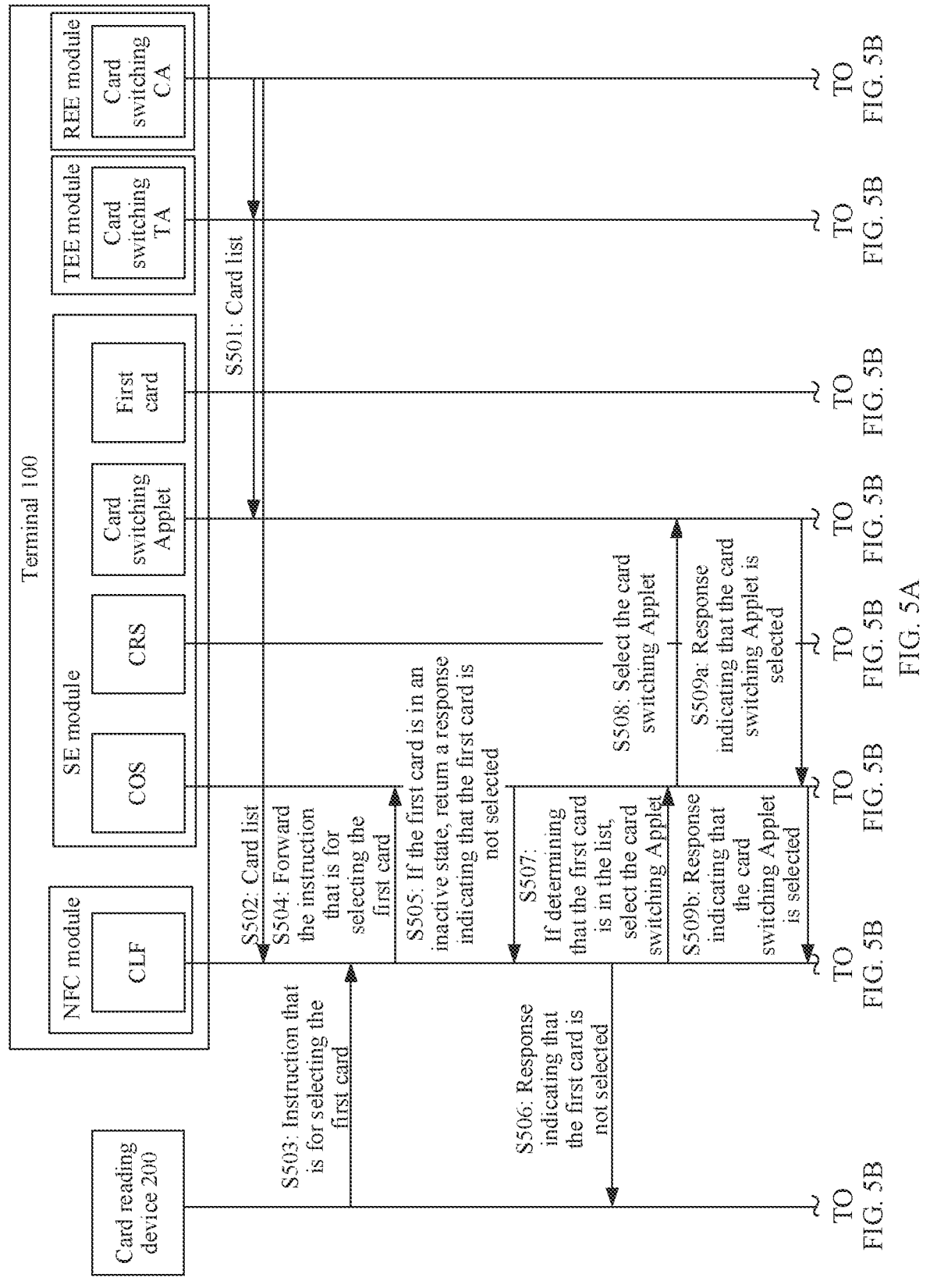
FIG. 5A to FIG. 5C are a schematic flowchart of another automatic security service switching method according to an embodiment of this application.
Figure 5B:
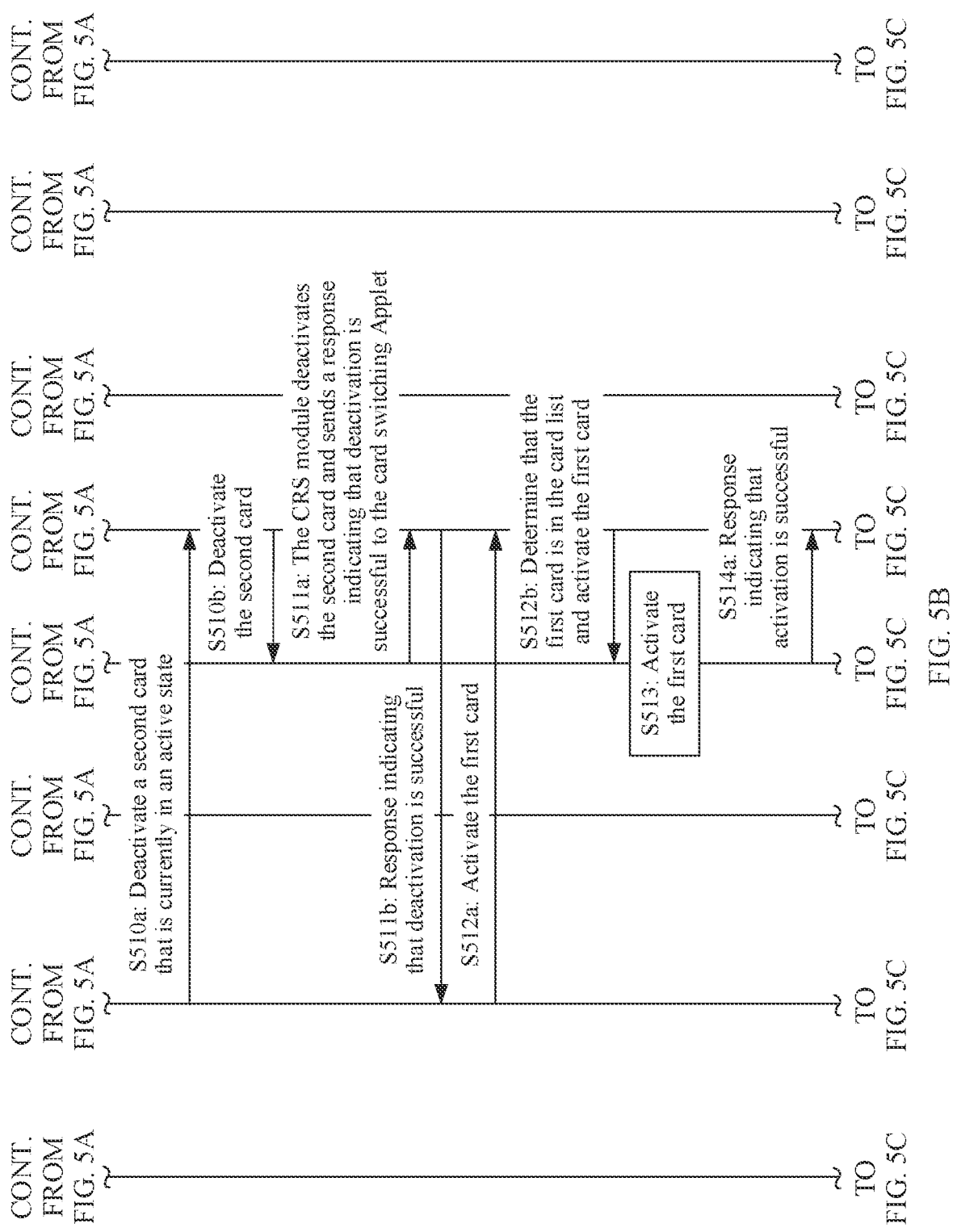
Figure 5C:
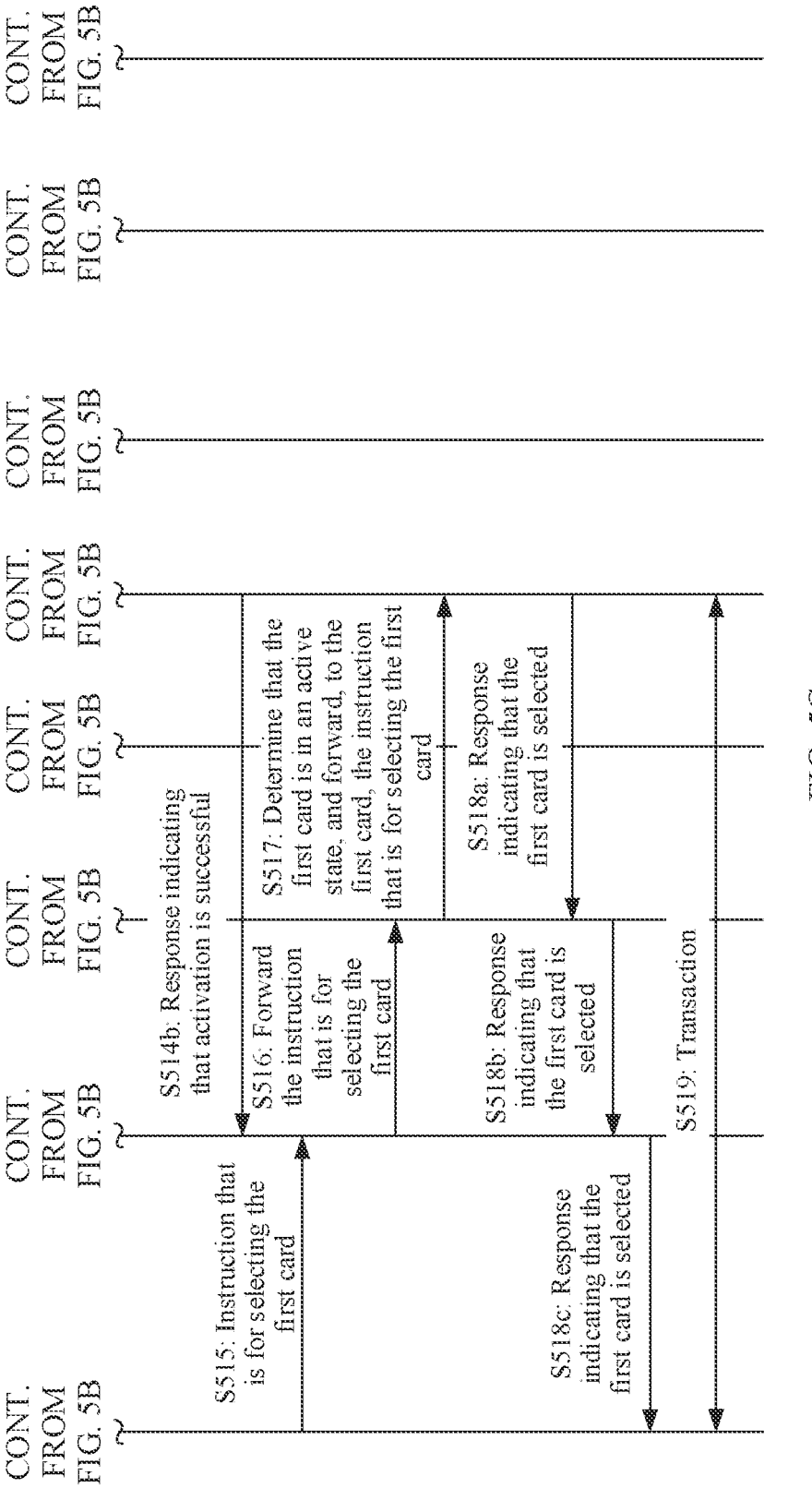

In the foregoing embodiment, the CRS in the SE module is configured to perform security check on the instruction, from the NFC module, that is for activating the first card. In some other embodiments, another module (for example, a card switching Applet) in the SE module may perform security check on the instruction, from the NFC module, that is for activating the first card. FIG. 5A to FIG. 5C are a schematic flowchart of another automatic security service switching method according to an embodiment of this application. The method includes the following steps.

S501: A card switching CA sends, to a card switching Applet in an SE module by using a card switching TA, a list (namely, a whitelist) of cards that allow automatic card switching, where the card list includes information about one or more cards.

In this embodiment, the card switching Applet in the SE module performs security check on an instruction that is for activating a first card. Therefore, the card switching CA sends, to the card switching Applet by using the card switching TA, the list (namely, the whitelist) of cards that allow automatic card switching. In some examples, a list (namely, a whitelist) of cards for automatic card switching may alternatively be preset in the card switching Applet, that is, step S501 may not be performed. For other content, refer to step S301.

It should be noted that, after receiving the card list or another instruction that is for updating a card that allows automatic card switching, the card switching Applet in the SE module may first determine whether the instruction is from a TEE module, or more specifically, from a specific TA in the TEE module, for example, the card switching TA. If the instruction is from the TEE module, or more specifically from the specific TA in the TEE module, for example, the card switching TA, the card switching Applet stores a card list in the instruction, or updates the card list based on the instruction. In this way, another malicious application is prevented from sending a forged card list to the SE module, and a card is prevented from being maliciously activated, improving card transaction security in the SE module.

S502: The card switching CA sends the card list to the NFC module, where the card list includes information about one or more cards.

This step is the same as step S302.

It should be noted that step S502 may be performed simultaneously with step S501, or may be performed before step S501, or may be performed after step S501. A sequence of performing step S501 and step S502 is not limited in this application.

S503: The NFC module receives an instruction that is for selecting the first card and that is sent by a card reading device 200.

S504: The NFC module forwards, to a COS in the SE module, the instruction that is for selecting the first card.

S505: If determining that the first card is in an inactive state, the COS returns, to the NFC module, a response indicating that the first card is not selected.

S506: After receiving the response indicating that the first card is not selected, the NFC module returns, to the card reading device 200, the response indicating that the first card is not selected.

For step S503 to step S506, refer to content of step S303 to step S306. Details are not described herein again.

S507: After the NFC module receives the response indicating that the first card is not selected, the NFC module determines whether the first card is in the card list. If determining that the first card is in the card list, the NFC module sends, to the COS, an instruction that is for selecting the card switching Applet. The instruction that is for selecting the card switching Apple instructs the NFC module to subsequently send a deactivation instruction and an activation instruction to the card switching Applet, and the card switching Applet may execute the deactivation instruction and the activation instruction by invoking a CRS.

It may be understood that, as described in step S502, the NFC module stores the list of cards that allow automatic card switching. In this case, after the NFC module receives the response indicating that the first card is not selected, the NFC may query the list of cards that allow automatic card switching, to determine whether the first card allows automatic card switching. If the first card is in the list of cards that allow automatic card switching, and the NFC module determines that the first card allows automatic card switching, the NFC module triggers an action of automatically activating the first card, that is, selects the card switching Applet and indicates the CRS to activate the first card.

In some other embodiments, if the NFC module determines that the first card is not in the card list, the first card is a card that does not allow automatic card switching, and therefore the NFC module cannot automatically activate the first card. If the terminal 100 is in a power-on state, the NFC module may interact with an REE module, and the REE module prompts a user to manually activate the first card, or the REE module requests, by using the TEE module, the user to perform authentication, activates the first card after the authentication succeeds, and the like, to finally complete the transaction.

It should be noted that step S507 may be performed simultaneously with step S506, or may be performed before step S506, or may be performed after step S507. A sequence of performing step S506 and step S507 is not limited in this application. In some other examples, step S506 may not be performed.

S508: The COS forwards, to the card switching Applet, the instruction that is for selecting the card switching Applet.

S509a: The card switching Applet returns, to the COS, a response indicating that the card switching Applet is selected.

S509b: The COS forwards, to the NFC module, the response indicating that the card switching Applet is selected.

S510a: The NFC module sends, to the card switching Applet, an instruction that is for deactivating (deactivating) a second card that is currently in an active state. Deactivating the second card is to cancel the active state of the second card, so that the second card is in an inactive state.

It should be noted that different cards may have different contactless parameter settings. In other words, when a conflict exists in contactless parameter activation of two or more cards, these cards cannot be activated simultaneously. Therefore, in some examples, to avoid a failure in subsequently activating the first card, the NFC module may send, to the card switching Applet by using the COS, an instruction that is for deactivating all cards currently in the active state, that is, the second card indicates all cards currently in the active state. In some other examples, the NFC module may alternatively determine whether there are cards that are in the currently activated cards conflict with the first card to be activated, and deactivate only these cards that conflict with the first card to be activated. In other words, the second card is a card that conflicts with a contactless parameter for activating the first card.

Certainly, in some other examples, the NFC module may alternatively send a deactivation instruction to the card switching Applet by using the COS. The COS or the card switching Applet determines whether there are cards that are in the currently activated cards conflict with the first card to be activated, and deactivates only these cards that conflict with the first card to be activated. This is not specifically limited in this embodiment of this application.

S510b: The card switching Applet sends, to the CRS, an instruction that is for deactivating the second card.

Optionally, before the card switching Applet sends, to the CRS, the instruction that is for deactivating the second card, the card switching Applet may first determine whether the first card is in the card list. If the NFC module determines that the first card is in the card list, the first card is a card that allows automatic card switching, and then the card switching Applet deactivates the second card. If the NFC module determines that the first card is not in the card list, the first card is a card that does not allow automatic card switching, and the card switching Applet does not need to deactivate the second card.

S511a: The CRS deactivates the second card, and returns, to the card switching Applet, a response indicating that deactivation is successful.

S511b: The card switching Applet returns the response, to the NFC module, indicating that deactivation is successful.

The card switching Applet sends, to the NFC module by using the COS, the response indicating that deactivation is successful.

S512a: The NFC module sends, to the card switching Applet, the instruction that is for activating the first card.

The NFC module sends, to the card switching Applet by using the COS, the instruction that is for activating the first card.

S512b: The card switching Applet determines whether the first card is in the card list. If the first card is in the card list, the card switching Applet sends, to the CRS, the instruction that is for activating the first card.

In this application, the card switching Applet may perform security check on the card activation instruction from the NFC module based on the pre-stored list of cards that allow automatic card switching. As described in step S501, the card switching Applet obtains the list of cards that allow automatic card switching. It should be emphasized that the card switching Applet stores only a list of cards that allow automatic card switching from the TEE module (for example, the card switching TA), to ensure card transaction security. If the first card is in the card list, the first card is a card that allows automatic card switching, and the card switching Applet activates the first card. If the first card is not in the card list, the card switching Applet does not activate the first card.

S513: The CRS activates the first card.

S514a: The CRS sends, to the card switching Applet, a response indicating that the first card is successfully activated.

S514b: The card switching Applet sends, to the NFC module, the response indicating that the first card is successfully activated.

The card switching Applet sends, to the NFC module by using the COS, the response indicating that the first card is successfully activated.

S515: The NFC module receives the instruction that is for selecting the first card and that is sent by the card reading device 200.

S516: The NFC module forwards, to the COS in the SE module, the instruction that is for selecting the first card.

S517: If the COS determines that the first card is in an active state, the COS forwards, to the first card, the instruction that is for selecting the first card.

S518: The first card returns, to the card reading device 200, the response indicating that the first card is selected.

This step is shown in step S518a, step S518b, and step S518c in the figure.

S519: The card reading device 200 starts a transaction with the first card in the terminal 100.

For step S515 to step S519, refer to related content in step S315 to step S319.

In conclusion, in this embodiment, the NFC module triggers the action of automatically activating the first card, and the card switching Applet in the SE module performs security check on the action of activating the first card, to implement a function of automatically activating the first card. It may be learned that in this application, an entire automatic card switching path is in the NFC module and the SE module, and does not pass through the REE module and the TEE module. Therefore, in this application, a speed of automatic card switching is accelerated. In addition, it should be noted that, when the terminal 100 is powered off, remaining power of the terminal 100 may supply power to the NFC module and the SE module of the terminal 100. In other words, the NFC module and the SE module of the terminal 100 may still work, and automatic card switching may still be implemented. In other words, w % ben the terminal 100 is powered off, automatic card switching of the terminal 100 can still be implemented in this application.

In addition, compared with the conventional technology, in the embodiment shown in FIG. 5A to FIG. 5C, service logic of the NFC module of the terminal 100 and service logic of the SE module are correspondingly modified. For example, compared with the conventional technology, in this embodiment, the card switching Applet is added to the SE module, or a function of the card switching Applet in this embodiment is added to another module in the SE module. Step S501, step S502, step S507, step S510a, step S510b, step S512a, step S512b, and the like are added.

Figure 6A:
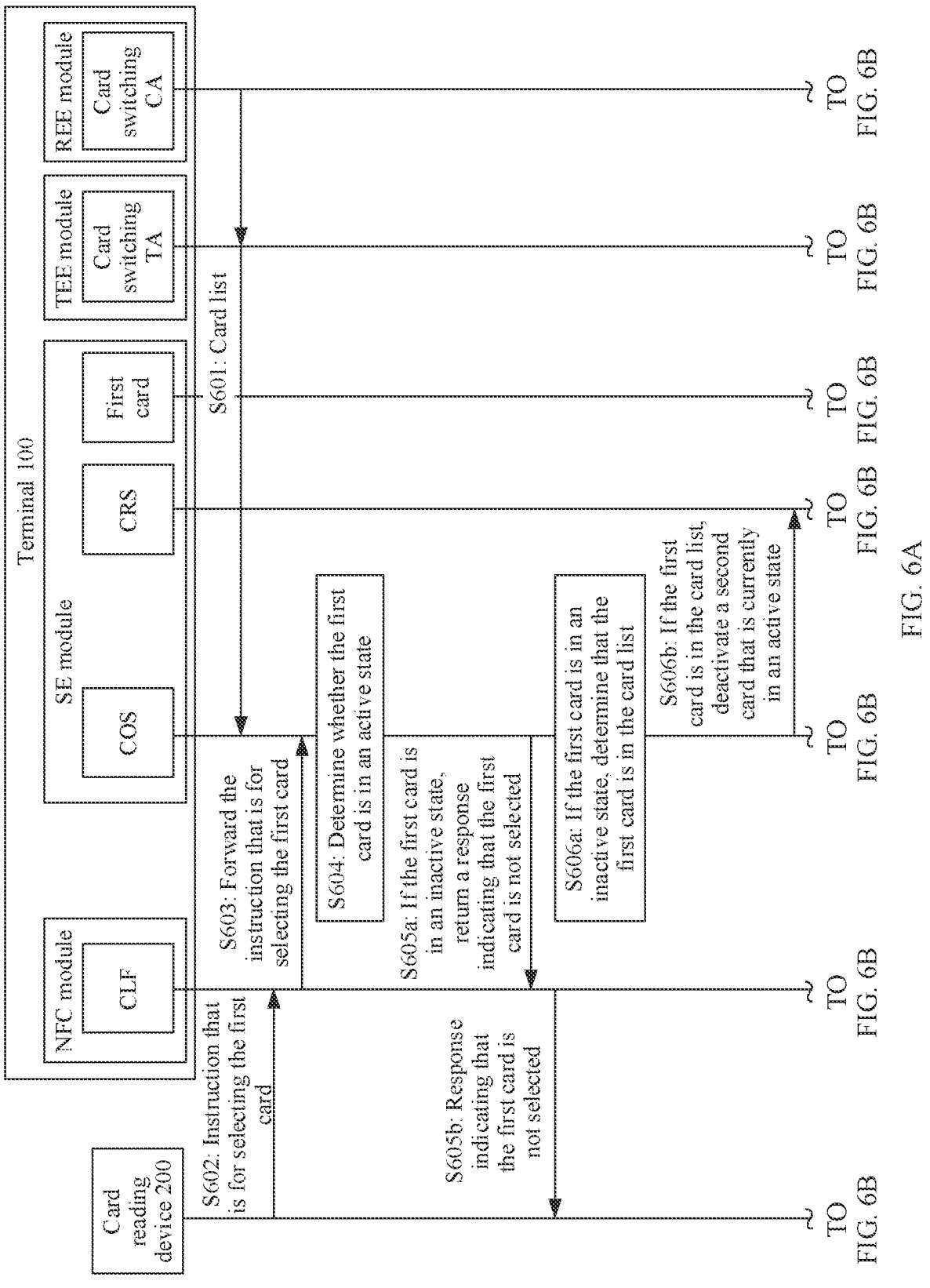
FIG. 6A and FIG. 6B are a schematic flowchart of another automatic security service switching method according to an embodiment of this application.
Figure 6B:
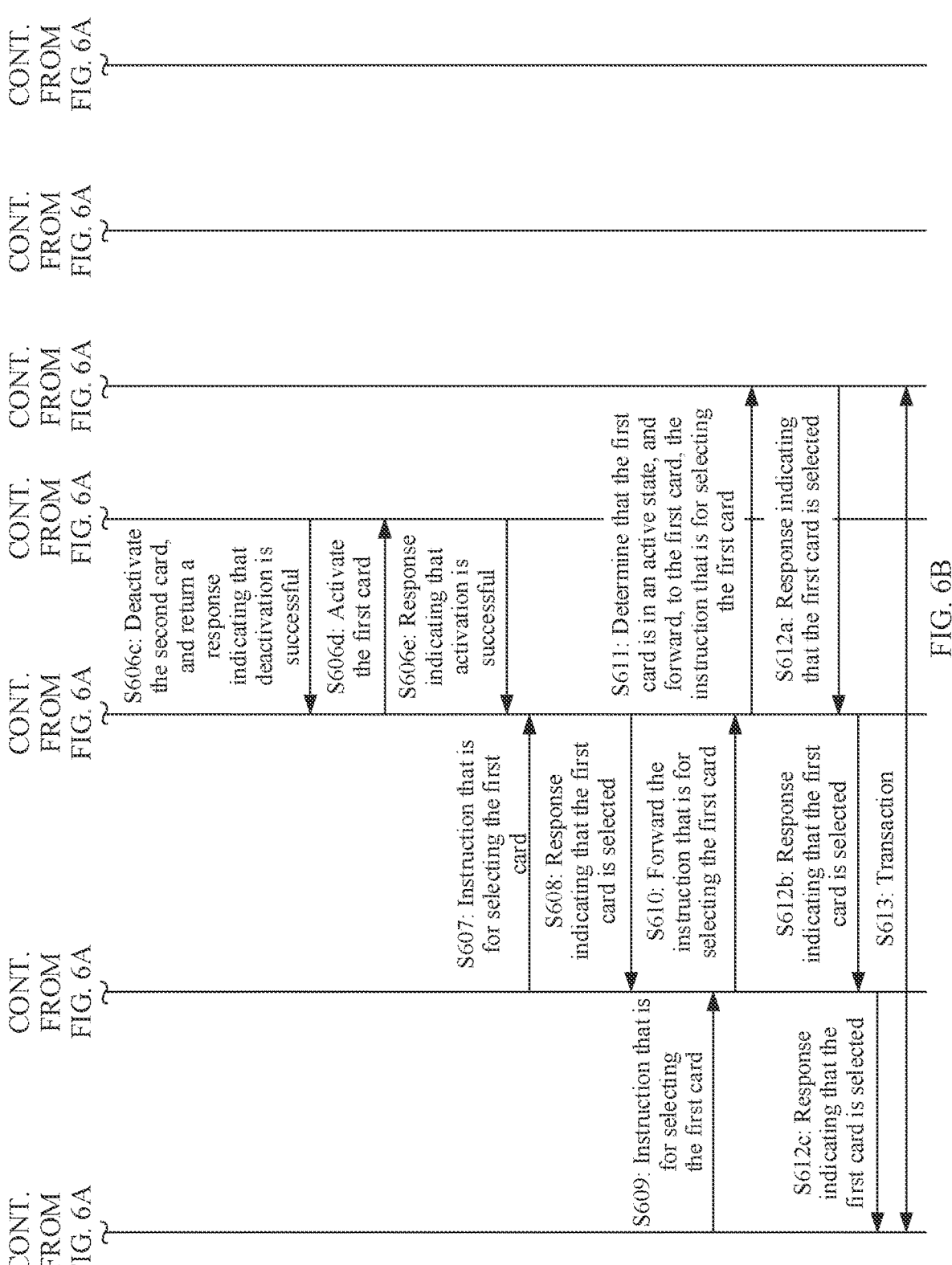

In the foregoing embodiment, different modules in the terminal 100 trigger the action of automatically activating the first card and performing security check. In some other embodiments, a same module (for example, the COS in the SE module) in the terminal 100 may trigger the action of automatically activating the first card and performing security check. FIG. 6A and FIG. 6B are a schematic flowchart of still another automatic security service switching method according to an embodiment of this application. The method includes the following steps.

S601: A card switching CA sends, to a COS in an SE module by using a card switching TA, a list (namely, a whitelist) of cards that allow automatic card switching, where the card list includes information about one or more cards.

In this embodiment, the COS in the SE module initiates automatic activation of the first card and performs security check on the instruction that is for activating the first card. Therefore, the card switching CA sends, to the COS by using the card switching TA, the list (that is, the whitelist) of cards that allow automatic card switching. In some examples, a list (namely, a whitelist) of cards for automatic card switching may alternatively be preset in the COS, that is, step S601 may not be performed. For other content, refer to step S301.

It should be noted that, after receiving the card list or another instruction that is for updating a card that allows automatic card switching, the COS in the SE module may first determine whether the instruction is from the TEE module, or more specifically, from a specific TA in the TEE module, for example, the card switching TA. If the instruction is from the TEE module, or more specifically from the specific TA in the TEE module, for example, the card switching TA, the COS stores a card list in the instruction, or updates the card list based on the instruction. In this way, another malicious application is prevented from sending a forged card list to the SE module, improving card transaction security in the SE module.

S602: An NFC module receives an instruction that is for selecting a first card and that is sent by a card reading device 200.

S603: The NFC module forwards, to the COS in the SE module, the instruction that is for selecting the first card.

S604: After receiving the instruction that is for selecting the first card, the COS determines whether the first card is in an active state.

If the COS determines that the first card is in an inactive state, the following step S605a and step S606a are performed. If the COS determines that the first card is in the active state, the following step S611 is performed.

S605a: If the first card is in an inactive state, the COS returns, to the NFC module, a response indicating that the first card is not selected.

S605b: The NFC module returns, to the card reading device 200, the response indicating that the first card is not selected.

S606a: If the first card is in the inactive state, the COS determines whether the first card is in the card list.

It should be noted that step S606a may be performed simultaneously with step S605a, or may be performed after step S605a, or may be performed before step S605a. A sequence of performing step S606a and step S605a is not limited in this embodiment of this application.

S606b: If the first card is in the card list, the COS sends, to a CRS, an instruction that is for deactivating a second card. The second card is in an active state.

It should be noted that if the first card is not in the card list, the COS does not automatically activate the first card, and the terminal 100 does not perform step S606b to step S606e.

S606c: The CRS deactivates the second card, and returns, to the COS, a response indicating that the second card is successfully deactivated.

S606d: The COS sends, to the CRS, an instruction that is for activating the first card.

S606e: The CRS activates the first card, and returns, to the COS, a response indicating that the first card is successfully activated.

S607: The NFC module sends, to the COS again, the instruction that is for selecting the first card.

After the NFC module receives the response returned by the COS indicating that the first card is not selected, that is, after step S605a, the NFC module sends, to the COS again, the instruction that is for selecting the first card.

S608: If the COS determines that the first card is in an active state, the COS returns, to the NFC module, a response indicating that the first card is selected.

It should be noted that in step S607, that the NFC module sends, to the COS again, the instruction that is for selecting the first card is that the NFC module is configured to distinguish whether the first card is a card that allows automatic card switching, so that the NFC module executes different service logic for the card that allows automatic card switching and a card that does not allow automatic card switching. In this embodiment, the card switching CA sends, to the COS in the SE module by using the card switching TA, the list of cards that allow automatic card switching. However, the NFC module does not store the list of cards that allow automatic card switching. Therefore, the NFC module does not know whether the first card is a card that allows automatic card switching. However, the NFC module sends the instruction that is for selecting the first card again (that is, step S607 is performed). If the NFC module receives the response indicating that the first card is selected (that is, step S608 is performed), it may be determined that the first card is the card allow automatic card switching. This is because if the first card is the card that allows automatic card switching, the COS automatically activated the first card in step S606d. The NFC module sends the instruction that is for selecting the first card again (that is, step S607 is performed). However, if the NFC module still receives the response indicating that the first card is not selected, the NFC module may determine that the first card is the card that does not allow automatic card switching (for example, a card that requires user verification, such as a bank card that requires user authentication or an access control card in a secure area). In this case, the NFC module may execute service logic of non-automatic card switching for the card that does not allow automatic card switching. For example, if the terminal 100 is in a power-on state, the NFC module may interact with an REE module, and the REE module prompts a user to manually activate the first card, or the REE module requests, by using the TEE module, the user to perform authentication, activates the first card after the authentication succeeds, and the like, to finally complete the transaction.

It should be noted that, in this case, a response that is received by the NFC and that indicates that the first card is successfully selected is for the instruction that is actively initiated by the NFC module for selecting the first card in step S607, but is not for the instruction that is actively initiated by the card reading device 200 for selecting the first card. Therefore, the NFC module does not return, to the card reading device 200, the response indicating that the first card is selected, and does not establish a transaction between the card reading device 200 and the first card.

S609: The NFC module receives the instruction that is for selecting the first card and that is sent by the card reading device 200.

S610: The NFC module forwards, to the COS in the SE module, the instruction that is for selecting the first card.

S611: If the COS determines that the first card is in an active state, the COS forwards, to the first card, the instruction that is for selecting the first card.

S612: The first card returns, to the card reading device 200, the response indicating that the first card is selected.

This step is shown in step S612a, step S612b, and step S612c in the figure.

S613: The card reading device 200 starts a transaction with the first card in the terminal 100.

For step S609 to step S613, refer to related content in step S315 to step S319.

In conclusion, in this embodiment, the COS determines whether the to-be-activated first card is in the card list, which is used to trigger an action of automatically activating the first card, and perform security check on the action of activating the first card. Therefore, fewer interaction instructions are involved in an automatic card switching process, and efficiency of the automatic card switching process is higher. Similarly, in this application, an entire automatic card switching path is in the NFC module and the SE module, and does not pass through the REE module and the TEE module. Therefore, when the terminal 100 is powered off, automatic card switching of the terminal 100 can still be implemented in this application.

In addition, compared with the conventional technology, in the embodiment shown in FIG. 6A and FIG. 6B, the NFC module of the terminal 100 and a service logic of the COS in the SE module are correspondingly modified. For example, compared with the conventional technology, step S601, steps S606*a* to S606*e*, and step S607 are added.

Figures 1, 7A:
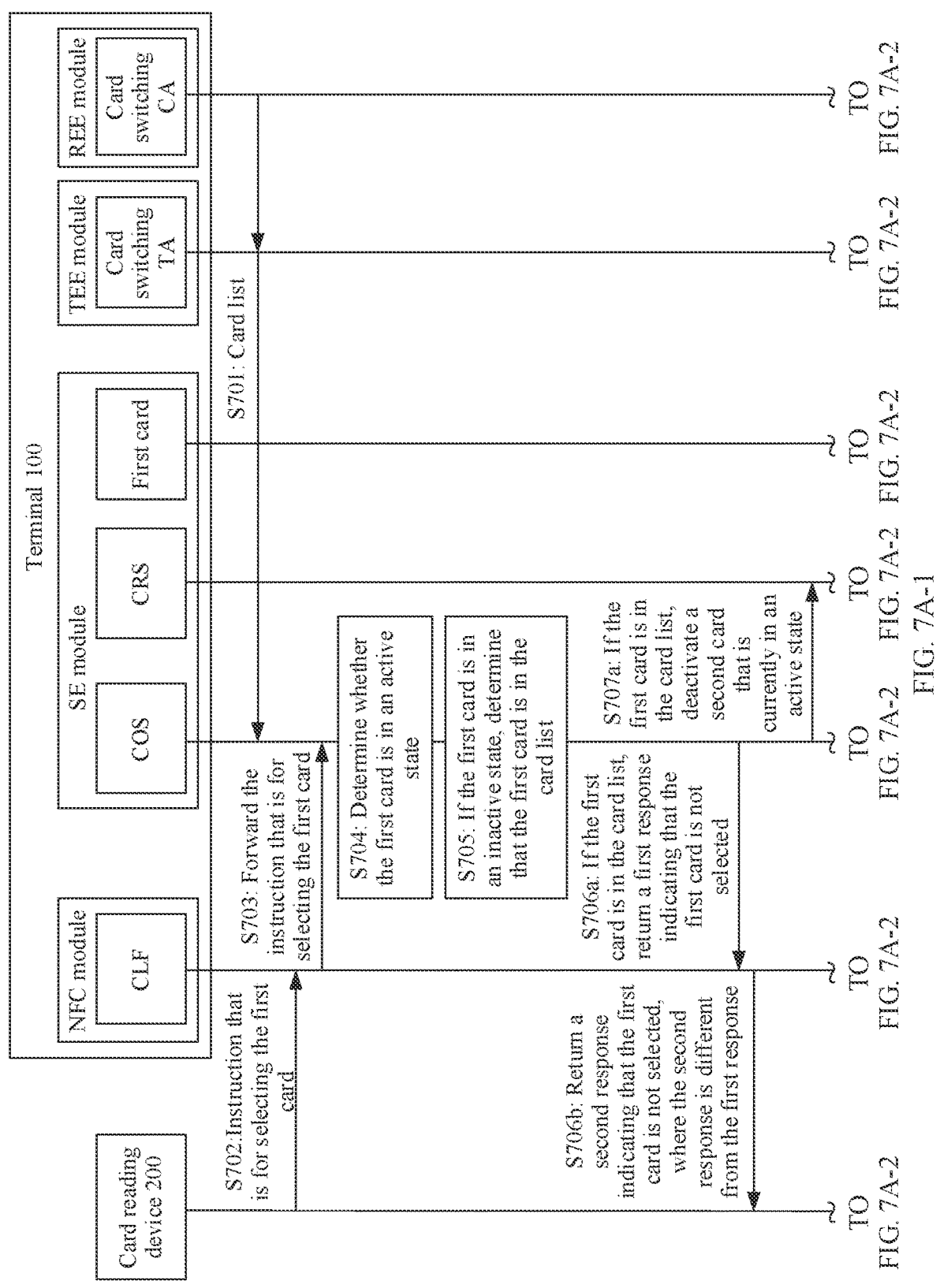
Figures 2, 7A:
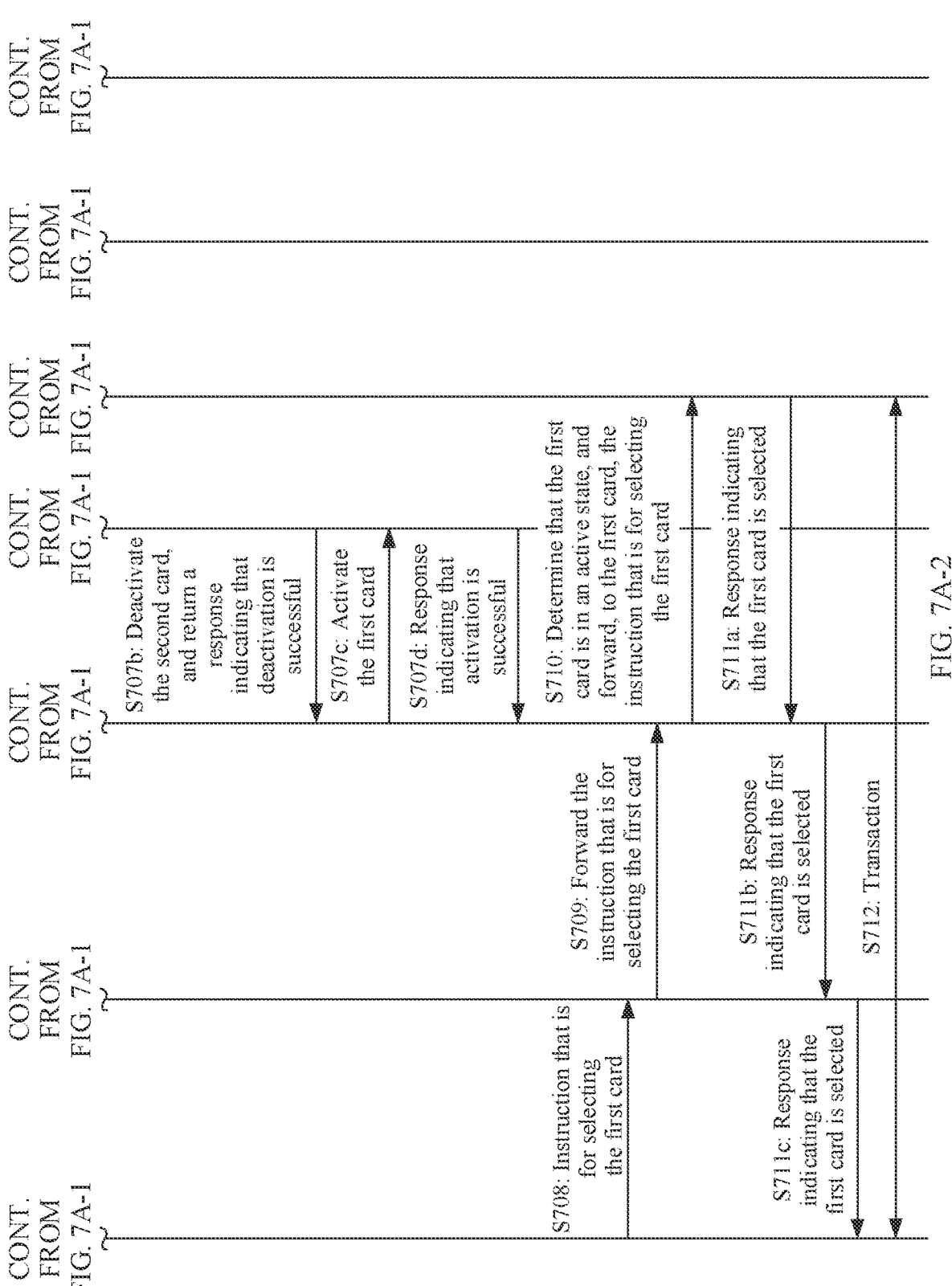

In the foregoing embodiment, after receiving the response indicating that the first card is not selected, the NFC module sends, to the COS again, the instruction that is for selecting the first card, and then determines, based on the response returned by the COS, whether the first card is the card that allows automatic card switching. Therefore, when the NFC module determines that the first card is the card that does not allow automatic card switching, service logic of non-automatic card switching is executed. In some other embodiments, a same module (for example, the COS in the SE module) in the terminal 100 still triggers an action of automatically activating the first card and performs security check, but the COS returns different responses for a card that allows automatic card switching and a card that does not allow automatic card switching. In this case, the NFC module may determine, based on different responses, whether the first card is a card that allows automatic card switching, and execute different service logic. Specifically, FIG. 7A-1 and FIG. 7A-2 are a schematic flowchart of yet still another automatic security service switching method according to an embodiment of this application. The method includes the following steps.

S701: A card switching CA sends, to a COS in an SE module by using a card switching TA, a list (namely, a whitelist) of cards that allow automatic card switching, where the card list includes information about one or more cards.

In this embodiment, the COS in the SE module initiates automatic activation of a first card and performs security check on an instruction that is for activating the first card. Therefore, the card switching CA sends, to the COS by using the card switching TA, the list (that is, the whitelist) of cards that allow automatic card switching. In some examples, a list (namely, a whitelist) of cards for automatic card switching may alternatively be preset in the COS, that is, step S701 may not be performed. For other content, refer to step S301.

It should be noted that, after receiving the card list or another instruction that is for updating a card that allows automatic card switching, the COS in the SE module may first determine whether the instruction is from the TEE module, or more specifically, from a specific TA in the TEE module, for example, the card switching TA. If the instruction is from the TEE module, or more specifically from the specific TA in the TEE module, for example, the card switching TA, the COS stores a card list in the instruction, or updates the card list based on the instruction. In this way, another malicious application is prevented from sending a forged card list to the SE module, improving card transaction security in the SE module.

S702: An NFC module receives an instruction that is for selecting a first card and that is sent by a card reading device 200.

S703: The NFC module forwards, to the COS in the SE module, the instruction that is for selecting the first card.

S704: After receiving the instruction that is for selecting the first card, the COS determines whether the first card is in an active state.

If the COS determines that the first card is in an inactive state, step S705 is performed. If the COS determines that the first card is in the active state, step S710 is performed.

S705: If the first card is in the inactive state, the COS determines whether the first card is in the card list.

In some other embodiments, if the first card is in the active state, the COS forwards, to the first card, the instruction that is for selecting the first card, that is, performs step S710.

S706*a*: If the first card is in the card list, the COS sends, to the NFC module, a first response indicating that the first card is not selected.

In some embodiments, after the COS determines that the first card is in the card list, and determines that the first card is a card that allows automatic card switching, the COS returns the first response to the NFC, and the first response notifies the NFC module that the first card is not selected, and the first card is a card that allows automatic card switching. In an example, the first response is a customized response.

S706*b*: The NFC module returns, to the card reading device 200, a second response indicating that the first card is not selected. The second response is different from the first response.

In some embodiments, the second response is a response (for example, an error code carried in the response is 6A82) indicating that a card is not selected defined in a GP protocol. To be specific, after receiving the first response indicating that the first card is not selected, the NFC module sends the second response to the card reading device 200, to notify the card reading device 200 that the first card is not selected this time. It may be learned that, in this embodiment, a communication protocol between the card reading device 200 and the terminal 100 (specifically, the NFC module) does not need to be modified.

S707*a*: If the first card is in the card list, the COS sends, to a CRS, an instruction that is for deactivating the second card, where the second card is in an active state.

It should be noted that if the first card is not in the card list, the COS does not automatically activate the first card, and the terminal 100 does not perform step S707*a* to step S707*d*.

S707*b*: The CRS deactivates the second card, and returns, to the COS, a response indicating that the second card is successfully deactivated.

S707*c*: The COS sends, to the CRS, an instruction that is for activating the first card.

S707*d*: The CRS activates the first card, and returns, to the COS, a response indicating that the first card is successfully activated.

S708: The NFC module receives the instruction that is for selecting a first card and that is sent by the card reading device 200.

S709: The NFC module forwards, to the COS in the SE module, the instruction that is for selecting the first card.

S710: If the COS determines that the first card is in an active state, the COS forwards, to the first card, the instruction that is for selecting the first card.

S711: The first card returns, to the card reading device 200, a response indicating that the first card is selected.

This step is shown in step S711*a*, step S711*b*, and step S711*c* in the figure.

S712: The card reading device 200 starts a transaction with the first card in the terminal 100.

For step S708 to step S712, refer to related content in step S315 to step S319.

In conclusion, in this embodiment, the COS determines whether the to-be-activated first card is in the card list, which is used to trigger an action of automatically activating the first card, and perform security check on the action of activating the first card. Therefore, fewer interaction instructions are involved in an automatic card switching process, and efficiency of the automatic card switching process is higher. In addition, in this embodiment, the COS returns different responses for a card that allows automatic card switching and a card that does not allow automatic card switching, and the NFC module determines, based on the different responses, whether the first card is the card that allows automatic card switching, and executes different service logic. It may be learned that, in this embodiment, interaction instructions involved in an automatic card switching process are further reduced, and efficiency of the automatic card switching process is higher. Similarly, in this application, an entire automatic card switching path is in the NFC module and the SE module, and does not pass through the REE module and the TEE module. Therefore, when the terminal 100 is powered off, automatic card switching of the terminal 100 can still be implemented in this application.

In addition, compared with the conventional technology, in the embodiment shown in FIG. 7A-1 and FIG. 7A-2, service logic of the NFC module of the terminal 100 and service logic of the COS in the SE module are correspondingly modified. For example, compared with the conventional technology, step S701, step S704 to step S706*a*, and step S707*a* to step S707*d* are added.

In the embodiment described in FIG. 7A-1 and FIG. 7A-2, an example in which the first card is in the card list is used for description. In some other embodiments, when the first card is not in the list, the terminal performs a procedure shown in FIG. 7B. Specifically, step S713, step S714*a*, and step S714*b* are performed after step S705.

S713: If the first card is not in the card list, the COS sends, to the NFC module, a second response indicating that the first card is not selected.

If the COS determines that the first card is not in the card list, the first card is a card that does not allow automatic card switching. In this case, the COS does not activate the first card, and the COS returns, to the NFC module, the second response indicating that the first card is not selected. The second response notifies the NFC module that the first card is not selected, and the first card is a card that does not allow automatic card switching. In an example, the second response is a response (for example, an error code carried in the response is 6A82) indicating that a card is not selected defined in GP.

S714*a*: The NFC module returns, to the card reading device 200, the second response indicating that the first card is not selected.

S714*b*: If the terminal 100 is powered on, execute service logic of non-automatic card switching; or if the terminal 100 is powered off end this procedure.

Step S714*b* may be performed simultaneously with step S714*a*, or may be performed before or after step S714*a*.

For example, if the terminal 100 is in a power-on state, the NFC module may interact with an REE module, and the REE module prompts a user to manually activate the first card (for example, the REE module prompts the user to select a card, and indicates, by using the TEE module, the SE module to activate the card selected by the user), or the REE module requests, by using the TEE module, the user to perform authentication, activates the first card after the authentication succeeds (for example, the REE module automatically selects a corresponding card, for example, a bank card, and then prompts the user to enter a fingerprint, a face, or the like for authentication, and the TEE module indicates the SE module to activate the card after the authentication succeeds), and the like, to finally complete the transaction.

It should be noted that step S714*b* may be performed simultaneously with step S714*a*, or may be performed before or after step S714*b*.

Figure 7B:
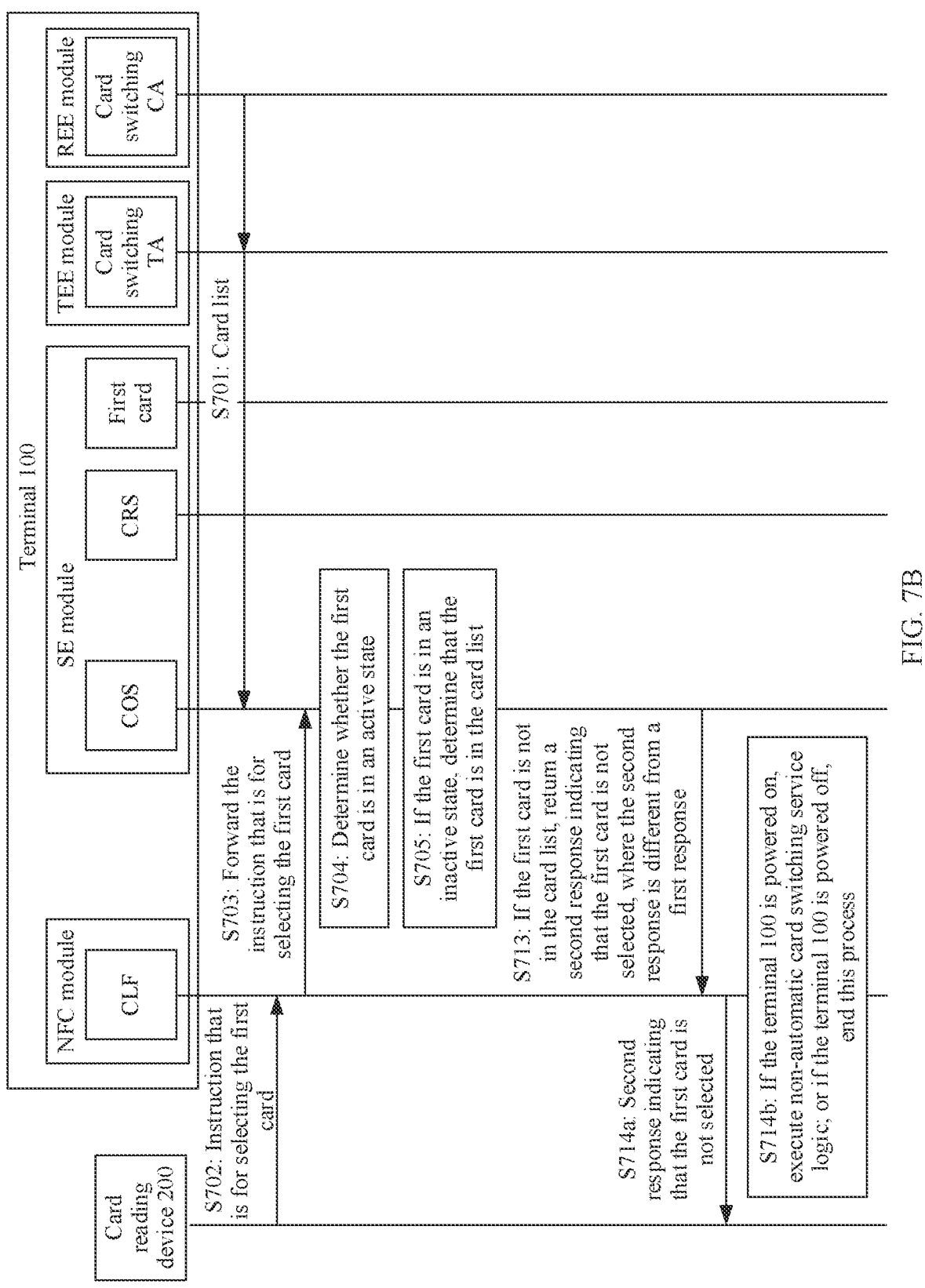
FIG. 7B is a schematic flowchart of another automatic security service switching method according to an embodiment of this application.

It may be learned from comparison between step S706 in FIG. 7A-1 and step S713 in FIG. 7B that, the response that indicates that the first card is not selected and that is returned by the COS to the NFC module when the COS determines that the first card is in the card list is different from the response that indicates that the first card is not selected and that is returned by the COS to the NFC module when the COS determines that the first card is not in the card list, so that the NFC module determines whether the first card is in the card list, to execute different service logic.

In addition, compared with the conventional technology, in the embodiment shown in FIG. 7B, service logic of the NFC module of the terminal 100 and service logic of the COS in the SE module are correspondingly modified. For example, compared with the conventional technology, step S713 is added.

The foregoing embodiments (the embodiments described in FIG. 3A and FIG. 3B, FIG. 5A to FIG. 5C, FIG. 6A and FIG. 6B, FIG. 7A-I and FIG. 7A-2, and FIG. 7B) are described by using an example in which all cards in the terminal 100 support the ISO/IEC 14443-4 protocol (an international standard for a contactless IC card). A card that supports the ISO/IEC 14443-4 protocol is also referred to as a standard card. It should be further noted that, in the ISO/IEC 14443-4 protocol, each card is identified by using an application identifier (application ID, AID). Therefore, a card that supports the ISO/IEC 14443-4 protocol is also referred to as an AID card, in other words, in the foregoing embodiment, the card reading device 200 and a standard card in the terminal 100 first complete a primary handshake through the ISO/IEC 14443-3 protocol, and then exchange a transaction-related instruction through the ISO/IEC 14443-4 protocol (for example, the card reading device 200 sends the instruction that is for selecting the first card, and the terminal 100 returns, to the card reading device 200, the response indicating that the first card is selected or the response indicating that the first card is not selected).

However, in a real scenario, the SE module may further include a card that supports the ISO/IEC 14443-3 protocol but does not support the ISO/IEC 14443-4 protocol, for example, a bus card or an access control card of an earlier version that cannot implement interconnection and interworking. The card that supports the ISO/IEC 14443-3 protocol but does not support the ISO/IEC 14443-4 protocol is also referred to as a non-standard card. It should be further noted that, in the ISO/IEC 14443-3 protocol, a UID is used to identify each card. Therefore, a non-standard card is also referred to as a user identifier (user ID, UID) card. In this case, after completing the primary handshake with the card reading device 200 by using the ISO/IEC 14443-3 protocol, the non-standard card in the terminal 100 may directly exchange a transaction-related instruction by using the ISO/IEC 14443-3 protocol. In other words, the terminal 100 may not receive an instruction that is for selecting a card and that is sent by the card reading device 200 through the ISO/IEC 14443-4 protocol. Therefore, an embodiment of this application further provides an automatic card switching method. After a terminal 100 and a card reading device 200 complete a primary handshake through the ISO/IEC 14443-3 protocol, an NFC module of the terminal 100 may automatically initiate an instruction that is for selecting a specific card based on the ISO/IEC 14443-4 protocol, so that a function of automatically switching a non-standard card is implemented through the ISO/IEC 14443-4 protocol.

With reference to the procedures shown in FIG. 7A-1 and FIG. 7A-2, and FIG. 7B, the following describes a method for implementing automatic switching of a non-standard card. It may be understood that a standard card and a non-standard card are added to the terminal 100. Herein, an example in which one or more standard cards and one non-standard card are added to the terminal 100 is used for description.

Figure 8A:
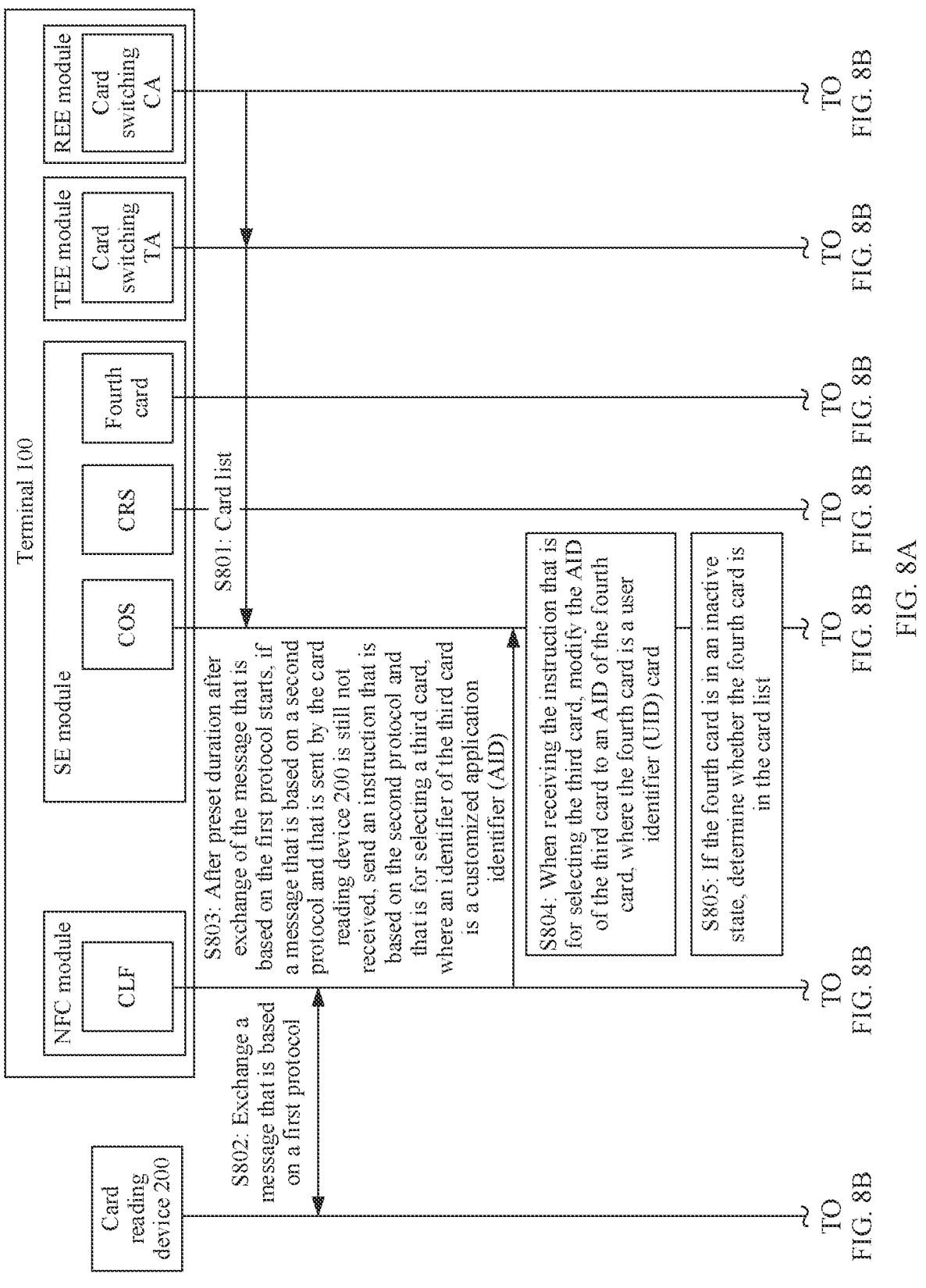
FIG. 8A and FIG. 8B are a schematic flowchart of another automatic security service switching method according to an embodiment of this application.
Figure 8B:
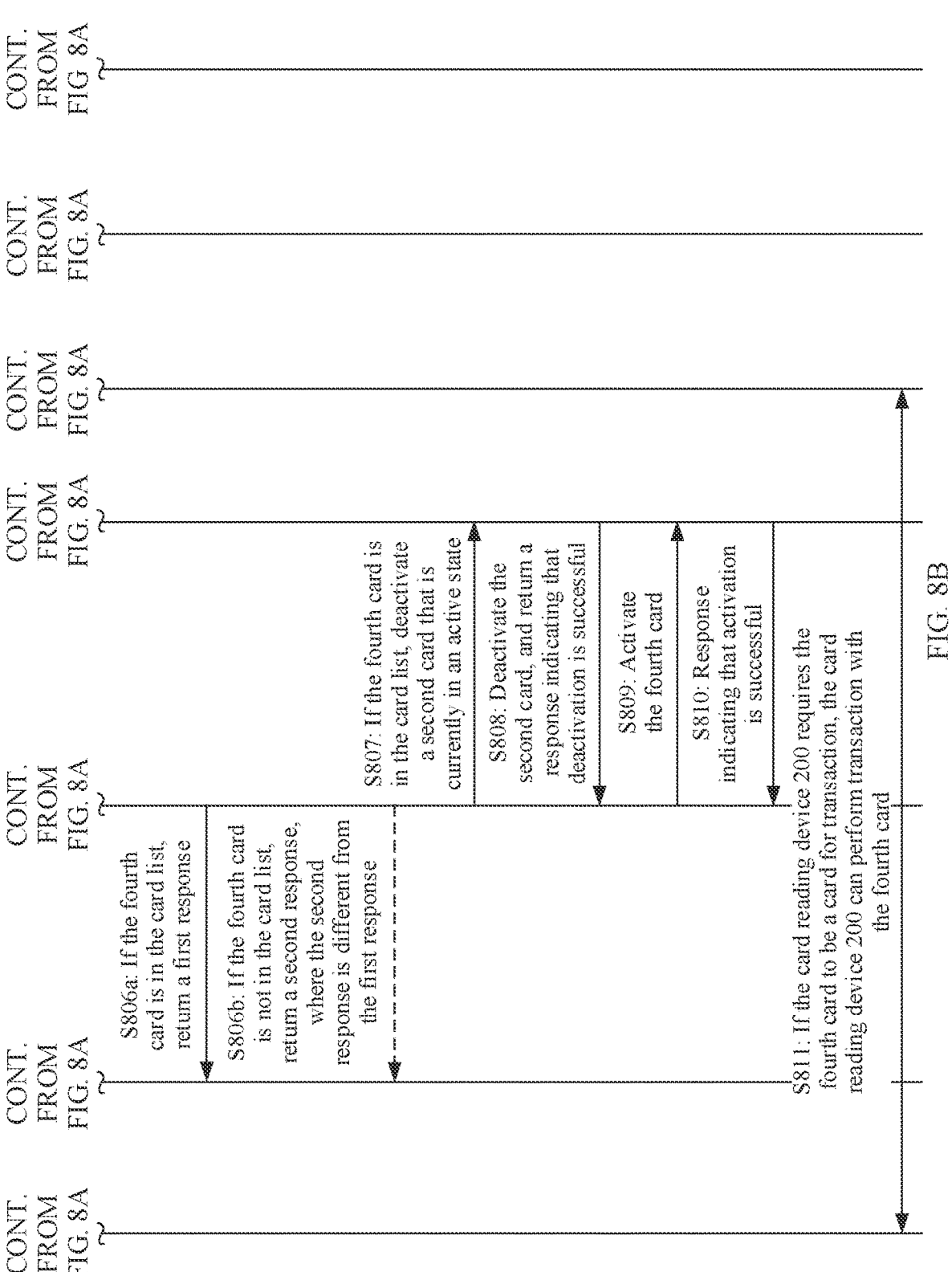

FIG. 8A and FIG. 8B are a schematic flowchart of an automatic security service switching method according to an embodiment of this application. The method includes the following steps.

S801: The card switching CA sends, to the COS in the SE module by using the card switching TA, a list (namely, a whitelist) of cards that allow automatic card switching, where the card list includes information about one or more cards.

The card list includes information about each standard card that allows automatic card switching, for example, an AID of each standard card. The standard card is, for example, a bus card, a key, or an electronic certificate that implements interconnection and interworking. Optionally, the card list further includes information about the non-standard card that allows automatic card switching, for example, a UID of the non-standard card and an AID corresponding to the non-standard card. In this application, the terminal 100 further sets a corresponding AID for the non-standard card, so that the terminal can subsequently automatically activate the non-standard card through the ISO/IEC 14443-4 protocol. For example, the non-standard card is, for example, a bus card or an access control card of an earlier version that cannot implement interconnection and interworking.

In this embodiment, the COS in the SE module initiates automatic activation of a first card and performs security check on an instruction that is for activating the first card. Therefore, the card switching CA sends, to the COS by using the card switching TA, the list (that is, the whitelist) of cards that allow automatic card switching. In some examples, a list (namely, a whitelist) of cards for automatic card switching may alternatively be preset in the COS, that is, step S801 may not be performed. For other content, refer to step S301.

S802: The terminal 100 (which is specifically the NFC module of the terminal 100) exchanges a message that is based on a first protocol (that is, the ISO/IEC 14443-3 protocol) with the card reading device 200, for example, performs a primary handshake process.

S803: After preset duration after the NFC module of the terminal 100 starts to exchange the message that is based on the first protocol with the card reading device 200, if the NFC module still does not receive a message that is based on a second protocol (that is, the ISO/IEC 144434 protocol) sent by the card reading device 200, the NFC module sends, to the COS, an instruction of selecting an instruction that is for selecting a third card and that is based on the second protocol. In an example, an identifier of the third card is a customized AID, that is, a preset AID.

If the card reading device 200 performs a standard card transaction with the terminal 100, after the card reading device 200 performs a process such as a primary handshake with the terminal 100 based on the first protocol, the card reading device 200 sends an instruction that is for selecting a specific standard card and that is based on the second protocol, for example, the instruction carries an AID of the standard card. In this case, if all the standard cards in the terminal 100 are not activated, automatic activation of the standard card may be implemented by using the procedure shown in FIG. 7A-1 and FIG. 7A-2, that is, automatic card switching is implemented.

If the card reading device 200 performs a non-standard card transaction with the terminal 100, after the card reading device 200 performs a process such as a primary handshake with the terminal 100 based on the first protocol, the card reading device 200 does not send an instruction that is for selecting a specific standard card and that is based on the second protocol. In this case, the NFC module of the terminal 100 cannot receive an instruction that is for selecting a standard card and that is based on the second protocol. Therefore, within preset duration (for example, 800 ms) after a process such as the primary handshake based on the first protocol starts to be performed, if the NFC module does not receive an instruction that is for selecting a card and that is sent by the card reading device 200 based on the second protocol, the NFC module may determine that a card required by the card reading device 200 for a transaction is a non-standard card, and automatically activate service logic of a non-standard card in the SE module. Specifically, the NFC module sends, to the COS, the instruction that is for selecting the third card and that is based on the second protocol, to trigger activation of the non-standard card in the SE module. The identifier of the third card is the customized AID. It should be noted that the third card herein is not a card that the card reading device 200 requires to perform a transaction.

S804: After receiving the instruction that is for selecting the third card, the COS modifies the AID of the third card to an AID of a fourth card, where the fourth card is a non-standard card that is added to the terminal 100.

In other words, the instruction that is for selecting the third card is changed to an instruction that is for selecting the fourth card, and subsequently, whether the fourth card is in an active state is determined. If the fourth card is in the active state, the procedure ends. If the fourth card is in an inactive state, whether the fourth card is in the card list is further determined, that is, step S805 and subsequent steps are performed.

S805: If the fourth card is in the inactive state, the COS determines whether the fourth card is in the card list.

In other words, it is determined whether the fourth card is a card that allows automatic switching.

S806a: If the fourth card is in the card list, the COS returns, to the NFC module, a first response indicating that a card is not selected.

In an example, the first response notifies the NFC module that the fourth card is not selected, and the fourth card is a card that allows automatic card switching. In an example, the first response is a customized response.

It should be noted that, m some other embodiments, if it is determined that the fourth card is not in the card list, the fourth card cannot be automatically activated, and the COS returns, to the NFC module, a second response indicating not being selected. In other words, step S806a is not performed, but step S806b is performed. The second response is different from the first response. In an example, the second response is a response (for example, an error code carried in the response is 6A82) indicating that a card is not selected defined in GP. Similar to the procedure in FIG. 7A-1 and FIG. 7A-2, after receiving the second response indicating that a card is not selected, the NFC module may determine that the fourth card is not in the card list and is a card that does not allow automatic card switching. In this case, the NFC module executes service logic of non-automatic card switching. For details, see the preceding descriptions.

Subsequent steps are further described by using an example in which the fourth card is in the card list.

S807: If the fourth card is in the card list, the COS sends, to the CRS, an instruction that is for deactivating the second card, where the second card is in an active state.

It should be noted that step S807 and step S806a may be performed simultaneously, or may be performed before or after step S806a. A sequence of performing step S807 and step S806a is not limited in this application.

S808: The CRS deactivates the second card, and returns, to the COS, a response indicating that the second card is successfully deactivated.

S809: The COS sends, to the CRS, an instruction that is for activating the fourth card.

S810: The CRS returns, to the COS, a response indicating that the fourth card is successfully deactivated.

S811: If a card required by the card reading device 200 for a transaction is the fourth card, the card reading device 200 performs a transaction with the fourth card.

It may be understood that if the card required by the card reading device 200 for a transaction is not the fourth card, the current transaction still fails.

In conclusion, when it is determined that the card required by the card reading device 200 for a transaction is a non-standard card, the terminal 100 automatically activates the non-standard card that allows automatic card switching, to improve a transaction success rate of the non-standard card. It may be understood that, when the card reading device 200 requires a non-standard card that is allowed to be automatically switched in the terminal 100, automatic switching of the non-standard card is implemented in this embodiment.

In addition, compared with the conventional technology, in the embodiment shown in FIG. 8A and FIG. 8B, service logic of the NFC module of the terminal 100 and service logic of the COS in the SE module are correspondingly modified. For example, compared with the conventional technology, step S803 to step S810 are added.

Based on a same idea, similar steps may also be added to the procedures shown in FIG. 3A and FIG. 3B, FIG. 4(1) to FIG. 4(3), and FIG. 6A and FIG. 6B. For example, after the NFC module of the terminal 100 starts to exchange a message that is based on the first protocol with the card reading device 200, if the NFC module of the terminal 100 still does not receive a message that is based on the second protocol (that is, the ISO/IEC 14443-4 protocol) sent by the card reading device 200, the NFC module sends, to the COS, an instruction that is for selecting a third card and that is based on the second protocol, and an identifier of the third card is a customized AID, that is, a preset AID. After receiving the instruction that is for selecting the third card, the COS/CRS modifies the instruction that is for selecting the third card to an instruction that is for selecting a fourth card, and the fourth card is a UID card that is added to the terminal 100. Then, it is determined whether the fourth card is activated. When the fourth card is not activated, it is determined whether the fourth card is in the card list. When the fourth card is in the card list, the fourth card is automatically activated, to implement automatic switching of a non-standard card. It should be noted that for subsequent processing of the instruction that is for selecting the fourth card (including how to determine whether the fourth card is activated, whether the fourth card is in the card list, how to activate the fourth card, and how to return a response to the NFC module and the card reading device 200), refer to processing of the instruction that is for selecting the first card in FIG. 3A and FIG. 3B, FIG. 4(1) to FIG. 4(3), and FIG. 6A and FIG. 6B. Details are not described herein again.

In conclusion, this application implements a function of automatically switching a card when the terminal 100 interacts with the card reading device 200. In addition, according to the method provided in embodiments of this application, efficiency of automatic card switching when the terminal 100 is powered on is improved, and a function of automatic card switching when the terminal 100 is powered off is further implemented.

Figure 9:
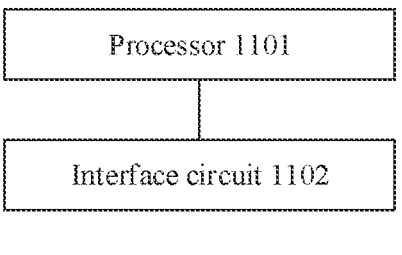
FIG. 9 is a schematic diagram of a structure of a chip system according to an embodiment of this application.

An embodiment of this application further provides a chip system. As shown in FIG. 9, the chip system includes at least one processor 1101 and at least one interface circuit 1102. The processor 1101 and the interface circuit 1102 may be interconnected through a line. For example, the interface circuit 1102 may be configured to receive a signal from another apparatus (for example, a memory in the terminal 100). For another example, the interface circuit 1102 may be configured to send a signal to another apparatus (for example, the processor 1101). For example, the interface circuit 1102 may read instructions stored in the memory, and send the instructions to the processor 1101. When the instructions are executed by the processor 1101, a terminal is enabled to perform steps performed by the terminal 100 (for example, a mobile phone) in the foregoing embodiments. Certainly, the chip system may further include another discrete device. This is not specifically limited in this embodiment of this application.

An embodiment of this application further provides an apparatus. The apparatus is included in a terminal, and the apparatus has a function of implementing behavior of the terminal in any method in the foregoing embodiments. The function may be implemented by hardware, or may be implemented by hardware executing corresponding software. The hardware or the software includes at least one module or unit corresponding to the foregoing function, for example, a detection module or unit, a display module or unit, a determining module or unit, and a calculation module or unit.

An embodiment of this application further provides a computer storage medium that includes computer instructions. When the computer instructions are run on a terminal, the terminal is enabled to perform any method in the foregoing embodiments.

An embodiment of this application further provides a computer program product. When the computer program product is run on a computer, the computer is enabled to perform any method in the foregoing embodiments.

An embodiment of this application further provides a graphical user interface on a terminal. The terminal includes a display, a camera, a memory, and one or more processors. The one or more processors are configured to execute one or more computer programs stored in the memory; and the graphical user interface includes a graphical user interface displayed when the terminal performs any method in the foregoing embodiments.

It may be understood that to implement the foregoing functions, the terminal or the like include corresponding hardware structures and/or software modules for performing the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solution. A person skilled in the art may use different methods to implement the described functions for each particular application, but it should not be considered that the implementation goes beyond the scope of embodiments of the present invention.

In embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that in embodiments of the present invention, module division is an example, and is merely a logical function division. During actual implementation, another division manner may be used.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented based on a requirement, that is, an inner structure of an apparatus is divided into different function modules to implement all or some of the functions described above. For a specific working process of the foregoing system, apparatus, and unit, refer to a corresponding process in the foregoing method embodiments, and details are not described herein again.

Function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a terminal, wherein the method comprises:
powering off the terminal;
powering, after the terminal is powered off, a secure element (SE) system of the terminal and a near-field communication (NFC) system of the terminal using a remaining power of the terminal, wherein the SE system comprises a first card, the first card is in an inactive state after the terminal is powered off;
receiving, from a first card reading device and using the NFC system, a first instruction for selecting the first card of the SE system
activating, using the SE system, the first card;
receiving, from the first card reading device and using the NFC system, a second instruction for selecting the first card; and
executing, in response to receiving the second instruction and using the first card, a transaction service with the first card reading device.

2. The method of claim 1, wherein before activating the first card, the method further comprises forwarding, using the NFC system and to the SE system, the first instruction.

3. The method of claim 2, further comprising:
identifying, using the SE system, that a second card of the SE system is in an active state when the terminal is powered off; and
determining, using the SE system and based on the first instruction, that the first card allows automatic card switching; and
deactivating, in response to identifying that the second card is in the active state, using the SE system, after determining that the first card allows the automatic card switching, and before activating the first card, the second card.

4. The method of claim 2, determining, using the SE system and based on the first instruction, that the first card allows automatic card switching, wherein after determining that the first card allows the automatic card switching, the method further comprises returning, to the NFC system and using the SE system, a first response indicating that the first card is not selected and the first card allows the automatic card switching.

5. The method of claim 4, wherein after returning the first response, the method further comprises: returning, by returning, to the first card reading device using the NFC system, a second response indicating that the first card is not selected, and wherein the second response is different from the first response.

6. The method of claim 2, further comprising:
receiving, when a second card of the SE system is in the inactive state, after the terminal is powered on, from a second card reading device, and using the NFC system, a third instruction for selecting the second card;
forwarding, using the NFC system and to the SE system, the third instruction;
determining, using the SE system and based on the third instruction, that the second card does not allow the automatic card switching; and
returning, after determining that the second card does not allow the automatic card switching, using the SE system, and to the NFC system, a response indicating that the second card is not selected and the fifth second card does not allow the automatic card switching.

7. The method of claim 6, wherein after returning the response, the method further comprises sending, after receiving the response, using the NFC system, and to a rich execution environment (REE) system of the terminal, a fourth instruction prompting a user to manually activate the second card.

8. The method of claim 1, wherein the first card is in the inactive state before the terminal is powered off.

9. The method of claim 1, further comprising:
  exchanging, using the NFC system and with a second card reading device, a first message that is based on a first protocol when the terminal is powered off, and
  sending, when the NFC system does not receive, from the second card reading device, a second message that is based on a second protocol, after a preset duration from when the terminal started to exchange the first message, using the NFC system, and to the SE system, a third instruction that is for selecting a second card and that is based on the second protocol, wherein the third instruction comprises a first preset application identifier (AID).

10. The method of claim 9, wherein after sending the third instruction, the method further comprises:
  modifying, after receiving the third instruction and using the SE system, the third instruction to a fourth instruction, wherein the fourth instruction comprises a second AID of third card, and wherein the third card is a user identifier (UID) card;
  determining that the third card is in the inactive state and allows the automatic card switching; and
  activating, using the SE system and in response to determining that the third card is in the inactive state and allows the automatic card switching, the third card.

11. The method of claim 1, determining, using the SE system and based on the first instruction, that the first card allows automatic card switching, wherein after determining that the first card allows the automatic card switching, the method further comprises instructing, using the NFC system, the SE system to activate the first card.

12. The method of claim 11, wherein determining that the first card allows the automatic card switching comprises:
  receiving, using the SE system, a third instruction for activating the first card, card; and
  determining, using the SE system and in response to the third instruction, that the first card allows the automatic card switching.

13. The method of claim 12, wherein before activating the first card, the method further comprises:
  identifying, using the SE system, that a second card of the SE system is in an active state when the terminal is powered off; and
  deactivating, using the SE system and in response to identifying that the second card is in the active state when the terminal is powered off, the second card.

14. The method of claim 11, wherein after receiving the first instruction, the method further comprises:
  forwarding, using the NFC system and to the SE system, the first instruction;
  returning, using the SE system, to the NFC system, and based on the first instruction, a response indicating that the first card is not selected; and
  determining, in response to receiving the response and using the NFC system, whether the first card allows the automatic card switching.

15. The method of claim 11, wherein before powering off the terminal, the method further comprises: receiving, using the NFC system, a card list comprising information about a second card that allows the automatic card switching.

16. The method of claim 1, wherein before powering off the terminal, the method further comprises receiving, using the SE system and from a trusted execution environment (TEE) system of the terminal, a card list comprising information about a second card that allows the automatic card switching.

17. A terminal comprising:
  a near-field communication (NFC) system; and
  one or more processors coupled to the NFC system, comprising a secure element (SE) system comprising a first card, and configured to:
    power off the terminal;
    power, after the terminal is powered off, the SE system and the NFC system using a remaining power of the terminal, wherein the SE system comprises a first card, the first card is in an inactive state after the terminal is powered off;
    receive, using the NFC system, and from a card reading device, a first instruction for selecting the first card;
    activate, using the SE system the first card;
    receive, from the card reading device and using the NFC system, a second instruction for selecting the first card; and
    execute, in response to receiving the second instruction and using the first card, a transaction service with the card reading device.

18. The terminal of claim 17, wherein before activating the first card, the one or more processors are further configured to forward, using the NFC system and to the SE system, the first instruction.

19. The terminal of claim 17, wherein the SE system further comprises a second card, wherein the second card is in an active state when the terminal is powered off, and wherein after determining that the first card allows the automatic card switching and before activating the first card, the one or more processors are further configured to deactivate, using the SE system, the second card.

20. The terminal of claim 18, wherein after determining that the first card allows the automatic card switching, the one or more processors are further configured to return, using the SE system and to the NFC system, a response indicating that the first card is not selected and the first card allows the automatic card switching.

* * * * *